US008642174B2

(12) United States Patent
Ito et al.

(10) Patent No.: US 8,642,174 B2
(45) Date of Patent: Feb. 4, 2014

(54) NEAR-INFRARED-ABSORBING PARTICLES, PROCESS FOR THEIR PRODUCTION, DISPERSION, AND ARTICLE THEREOF

(75) Inventors: Wakako Ito, Tokyo (JP); Keisuke Abe, Tokyo (JP); Makoto Hasegawa, Tokyo (JP); Mitsuo Osawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/432,254

(22) Filed: Mar. 28, 2012

(65) Prior Publication Data

US 2012/0183763 A1 Jul. 19, 2012

Related U.S. Application Data

(63) Continuation of application No. PCT/US2010/067166, filed on Sep. 30, 2010.

(30) Foreign Application Priority Data

Sep. 30, 2009 (JP) ................................. 2009-227554

(51) Int. Cl.
 *B32B 5/16* (2006.01)
 *B02C 19/00* (2006.01)
 *G02B 5/22* (2006.01)
(52) U.S. Cl.
 USPC ............................ 428/402; 428/328; 423/299
(58) Field of Classification Search
 None
 See application file for complete search history.

(56) References Cited

U.S. PATENT DOCUMENTS

| 6,702,961 B2 * | 3/2004 | Barker et al. ............... 252/518.1 |
| 6,792,961 B2 * | 9/2004 | Rosa ............................. 134/111 |
| 7,067,074 B2 * | 6/2006 | Ikeda et al. ................... 252/582 |
| 2008/0241492 A1 * | 10/2008 | Maeder et al. ............. 428/211.1 |
| 2010/0210772 A1 | 8/2010 | Hiwatashi |

FOREIGN PATENT DOCUMENTS

| JP | 06-207161 | 7/1994 |
| JP | 06-306349 | 11/1994 |
| JP | 07-053945 | 2/1995 |
| JP | 07-070548 | 3/1995 |
| JP | 2004-231708 | 8/2004 |
| JP | 2009205029 A * | 9/2009 |
| WO | WO 2009/020207 | 2/2009 |

OTHER PUBLICATIONS

Machine Translation of JP06-207161.*

(Continued)

*Primary Examiner* — Mark Ruthkosky
*Assistant Examiner* — Alexandre Ferre
(74) *Attorney, Agent, or Firm* — Oblon, Spivak, McClelland, Maier & Neustadt, L.L.P.

(57) ABSTRACT

To provide near-infrared-absorbing particles which have a high transmittance in the visible light region and a low transmittance in the near infrared region and which, when incorporated, can give a near-infrared-absorbing coating film wherein the transmittance sharply changes in the wavelength range of from 630 to 700 nm; a process for their production; and their dispersion. Near-infrared-absorbing particles consisting essentially of crystallites of $A_{1/n}CuPO_4$ and having a number average aggregated particle size is from 20 to 200 nm, wherein A is at least one member selected from the group consisting of alkali metals (Li, Na, K, Rb and Cs), alkaline earth metals (Mg, Ca, Sr and Ba) and $NH_4$, and n is 1 when A is an alkali metal or $NH_4$, or 2 when A is an alkaline earth metal.

20 Claims, 6 Drawing Sheets

(56) References Cited

OTHER PUBLICATIONS

Machine translation of JP2009-205029.*
Machine translation of JP06-207161 (2006).*
Machine translation of JP2009-205029(2009).*
International Search Report issued Dec. 7, 2010 in PCT/JP2010/067166 filed Sep. 30, 2010.

* cited by examiner

NEAR-INFRARED-ABSORBING PARTICLES, PROCESS FOR THEIR PRODUCTION, DISPERSION, AND ARTICLE THEREOF

TECHNICAL FIELD

The present invention relates to near-infrared-absorbing particles which absorb light in the near infrared region, a process for their production, a dispersion, or an article having a near-infrared-absorbing coating film.

BACKGROUND ART

The sensitivity of an imaging element (such as CCD or CMOS) for e.g. a camera, or a light receiving element for e.g. an automatic exposure meter, covers from the visible light region to the near infrared region. On the other hand, the spectral sensitivity of the human eyes is limited to the visible light region. Therefore, for example, in the case of a camera, the sensitivity of its imaging element is corrected to be close to the spectral sensitivity of the human eyes, by providing a near infrared filter to transmit light in the visible light region (from 420 to 630 nm) and to absorb or reflect light in the near infrared region (from 700 to 1,100 nm) between a lens and the imaging element. In order to bring the sensitivity closer to the spectral sensitivity of the human eyes, the near infrared filter is required to be such that the transmittance sharply changes in the wavelength range of from 630 to 700 nm.

As a near infrared filter, one having a near-infrared-absorbing coating film is known which is formed by coating the surface of a glass substrate with a coating material having e.g. a binder resin added to a dispersion having near-infrared-absorbing particles dispersed in a dispersion medium.

Further, as such near-infrared-absorbing particles, some which contain copper and phosphoric acid have been proposed.

(1) Near-infrared-absorbing particles to absorb light with a wavelength of from 700 to 1,100 nm, which were obtained by treating, with an aluminum compound, the surface of near-infrared-absorbing particles wherein the molar ratio of CuO/P$_2$O$_5$ is from 0.05 to 4 when copper is calculated as CuO, and phosphoric acid is calculated as P$_2$O$_5$ (Patent Document 1).

(2) A dispersion having copper phosphate dispersed in a dispersing medium by means of a dispersant (Patent Document 2).

It has been confirmed that the near-infrared-absorbing particles (1) and the dispersion (2), as well as a near-infrared-absorbing coating film formed by using them, absorb near infrared rays with a wavelength of at least 800 nm. However, such a near-infrared-absorbing coating film does not sufficiently satisfy the performance required for a near infrared filter, as the transmittance does not sharply change in the wavelength range of from 630 to 700 nm.

PRIOR ART DOCUMENTS

Patent Documents

Patent Document 1: JP-A-7-070548
Patent Document 2: JP-A-2004-231708

DISCLOSURE OF INVENTION

Technical Problem

The present invention is to provide near-infrared-absorbing particles which have a high transmittance in the visible light region and a low transmittance in the near infrared region and which, when incorporated, can give a near-infrared-absorbing coating film wherein the transmittance sharply changes in the wavelength range of from 630 to 700 nm; a process for their production; and a dispersion thereof.

Solution to Problem

The near-infrared-absorbing particles of the present invention consist essentially of crystallites of a compound represented by the following formula (1) and have a number average aggregated particle size of at most 200 nm:

$$A_{1/n}CuPO_4 \quad (1)$$

wherein A is at least one member selected from the group consisting of alkali metals (Li, Na, K, Rb and Cs), alkaline earth metals (Mg, Ca, Sr and Ba) and NH$_4$, and n is 1 when A is an alkali metal or NH$_4$, or 2 when A is an alkaline earth metal.

The number average aggregated particle size is preferably from 20 to 200 nm.

Further, the near-infrared-absorbing particles of the present invention consist essentially of crystallites of a compound represented by the following formula (1) and have a number average aggregated particle size of from 20 to 200 nm:

$$A_{1/n}CUPO_4 \quad (1)$$

wherein A is one member selected from the group consisting of alkali metals (Li, Na, K, Rb and Cs), alkaline earth metals (Mg, Ca, Sr and Ba) and NH$_4$, and n is 1 when A is an alkali metal or NH$_4$, or 2 when A is an alkaline earth metal.

The size of the crystallites obtained from the X-ray diffraction is preferably at most 80 nm.

The size of the crystallites obtained from the X-ray diffraction is preferably from 5 to 80 nm.

The near-infrared-absorbing particles of the present invention is preferably such that the change D in reflectance represented by the following formula (2) is at most −0.41:

$$D(\%/nm)=[R_{700}(\%)-R_{600}(\%)]/[700(nm)-600(nm)] \quad (2)$$

wherein R$_{700}$ is the reflectance at a wavelength of 700 nm in the diffuse reflection spectrum of the near-infrared-absorbing particles, and R$_{600}$ is the reflectance at a wavelength of 600 nm in the diffuse reflection spectrum of the near-infrared-absorbing particles.

The near-infrared-absorbing particles of the present invention is preferably such that the reflectance at a wavelength of 715 nm in the diffuse reflection spectrum is at most 19%, and the reflectance at a wavelength of 500 nm in the diffuse reflection spectrum is at least 85%.

The near-infrared-absorbing particles of the present invention is preferably such that in the microscopic IR spectrum, based on the absorption intensity (100%) of a peak in the vicinity of 1,000 cm$^{-1}$ attributable to a phosphate group, the absorption intensity of a peak in the vicinity of 1,600 cm$^{-1}$ attributable to water is at most 8%, and the absorption intensity of a peak in the vicinity of 3,750 cm$^{-1}$ attributable to a hydroxy group is at most 26%.

The process for producing near-infrared-absorbing particles of the present invention comprises the following steps (a) to (c):

(a) a step of mixing a salt containing Cu$^{2+}$ and a salt or organic substance containing PO$_4^{3-}$ in a molar ratio of PO$_4^{3-}$ to Cu$^{2+}$ (PO$_4^{3-}$/Cu$^{2+}$) being from 10 to 20, in the presence of A$^{n+}$, (b) a step of firing the product obtained in the above step (a) at from 560 to 760° C., and (c) a step of pulverizing the fired product obtained in the above step (b) so that the number average aggregated particle size becomes to be at most 200 nm, (wherein A is at least one member selected from the group consisting of alkali metals (Li, Na, K, Rb and Cs), alkaline earth metals (Mg, Ca, Sr and Ba) and $NH_4$).

The fired product obtained in the above step (b) is preferably pulverized so that the number average aggregated particle size becomes to be from 20 to 200 nm.

Further, the process for producing near-infrared-absorbing particles of the present invention comprises the following steps (a) to (c):

(a) a step of mixing a salt containing $Cu^{2+}$ and a salt or organic substance containing $PO_4^{3-}$ in a molar ratio of $PO_4^{3-}$ to $Cu^{2+}$ ($PO_4^{3-}/Cu^{2+}$) being from 10 to 20, in the presence of $A^{n+}$, (b) a step of firing the product obtained in the above step (a) at from 560 to 760° C., and (c) a step of pulverizing the fired product obtained in the above step (b) so that the number average aggregated particle size becomes to be from 20 to 200 nm, (wherein A is one member selected from the group consisting of alkali metals (Li, Na, K, Rb and Cs), alkaline earth metals (Mg, Ca, Sr and Ba) and $NH_4$).

The dispersion of the present invention is one comprising the above-mentioned near-infrared-absorbing particles of the present invention dispersed in a dispersing medium.

The dispersion preferably contains from 10 to 60 mass % of the near-infrared-absorbing particles as a solid content of the dispersion.

The article having a near-infrared-absorbing coating film of the present invention is one wherein a near-infrared-absorbing coating film containing the above near-infrared-absorbing particles of the present invention is formed on a substrate.

The near-infrared-absorbing coating film is such that the change D' in transmittance represented by the following formula (3) is at most −0.36:

$$D'(\%/nm) = [T_{700}(\%) - T_{630}(\%)] / [700(nm) - 630(nm)] \quad (3)$$

wherein $T_{700}$ is the transmittance at a wavelength of 700 nm of the near-infrared-absorbing coating film, and $T_{630}$ is the transmittance at a wavelength of 630 nm of the near-infrared-absorbing coating film.

Advantageous Effects of Invention

The near-infrared-absorbing particles of the present invention have a high transmittance in the visible light region and a low transmittance in the near infrared region and, when incorporated, can form a near-infrared-absorbing coating film wherein the transmittance sharply changes in the wavelength range of from 630 to 700 nm.

According to the process for producing near-infrared-absorbing particles of the present invention, it is possible to produce near-infrared-absorbing particles of the present invention which have a high transmittance in the visible light region and a low transmittance in the near infrared region. And, by incorporating such near-infrared-absorbing particles, it is possible to obtain a near-infrared-absorbing coating film wherein the transmittance sharply changes in the wavelength range of from 630 to 700 nm.

The dispersion of the present invention has a high transmittance in the visible light region and a low transmittance in the near infrared region and is useful for forming a near-infrared-absorbing coating film wherein the transmittance sharply changes in the wavelength range of from 630 to 700 nm.

DESCRIPTION OF EMBODIMENTS

<Near-Infrared-Absorbing Particles>

The near-infrared-absorbing particles of the present invention are particles consisting essentially of crystallites of a compound represented by the following formula (1):

$$A_{1/n}CuPO_4 \quad (1)$$

wherein A is at least one member selected from the group consisting of alkali metals (Li, Na, K, Rb and Cs), alkaline earth metals (Mg, Ca, Sr and Ba) and $NH_4$, and n is 1 when A is an alkali metal or $NH_4$, or 2 when A is an alkaline earth metal.

Preferably, A is one member selected from the group consisting of alkali metals (Li, Na, K, Rb and Cs), alkaline earth metals (Mg, Ca, Sr and Ba) and $NH_4$, and n is 1 when A is an alkali metal or $NH_4$, or 2 when A is an alkaline earth metal.

A "crystallite" means a unit crystal which can be considered to be a single crystal, and a "particle" is composed of a plurality of crystallites.

Figure 1:
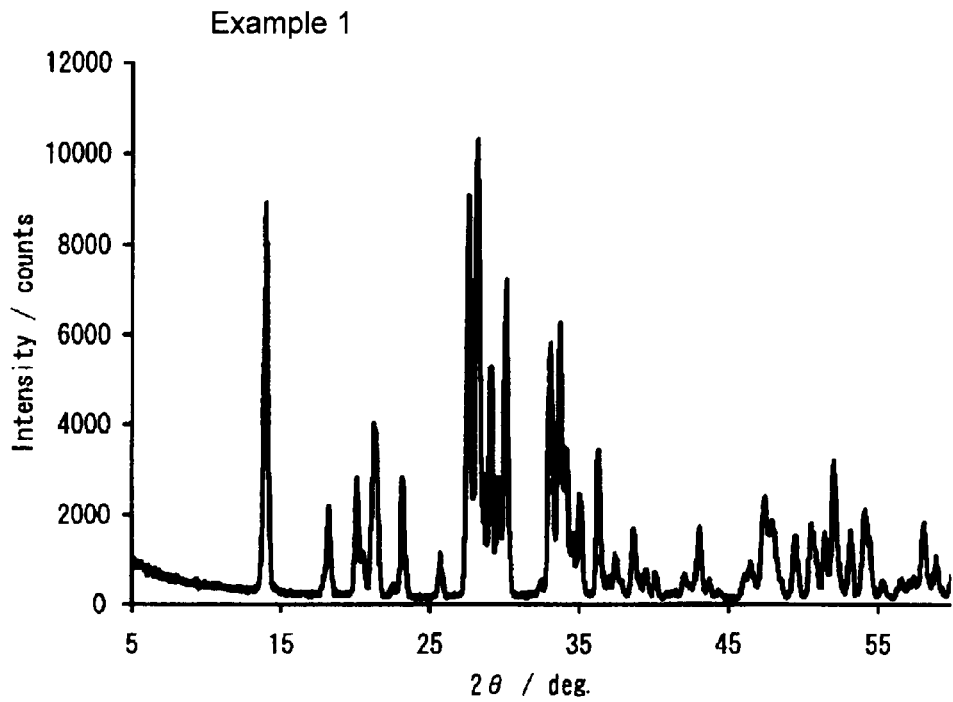
FIG. 1 is a graph showing the results of X-ray diffraction of the fired product in Example 1.

The expression "consisting essentially of crystallites of a compound represented by the formula (1)" means that, for example, as shown in FIG. 1, the crystal structure of $A_{1/n}CuPO_4$ can be confirmed by X-ray diffraction, and consisting essentially of crystallites of $A_{1/n}CuPO_4$ is identified by X-ray diffraction, and "consisting essentially of crystallites of $A_{1/n}CuPO_4$" means that the crystallites may contain impurities within a range where the crystal structure of $A_{1/n}CuPO_4$ can sufficiently be maintained (the crystal structure of $A_{1/n}CuPO_4$ can be confirmed by X-ray diffraction).

X-ray diffraction is measured by means of an X-ray diffraction apparatus with respect to the near-infrared-absorbing particles in a powder state.

The number average aggregated particle size of the near-infrared-absorbing particles of the present invention is at most 200 nm, preferably at most 100 nm. Further, the number average aggregated particle size of the near-infrared-absorbing particles of the present invention is at least 20 nm, preferably at least 30 nm, more preferably at least 50 nm. When the number average aggregated particle size is at least 20 nm, the crystallites can sufficiently maintain the crystal structure of $A_{1/n}CuPO_4$ and, as a result, can exhibit a sufficient near-infrared-absorbing property. When the number average aggregated particle size is at most 200 nm, the haze of the dispersion or a near-infrared-absorbing coating film formed by using it becomes low (i.e. the transmittance becomes high), such being suitable for e.g. an application to a near-infrared-absorption filter for a camera. The haze means a state where transmitted light passing through the near-infrared-absorbing coating film is diffused.

Here, the number average aggregated particle size is a value measured with respect to a dispersion for measuring the particle size, having the near-infrared-absorbing particles dispersed in a dispersing medium, by means of a dynamic light scattering particle size distribution measuring apparatus.

In the near-infrared-absorbing particles of the present invention, the crystal size is at most 80 nm, preferably from 5 to 80 nm, more preferably from 10 to 80 nm. When the crystal size is at least 5 nm, the crystallites can sufficiently maintain the crystal structure of $A_{1/n}CuPO_4$ and as a result, can exhibit sufficient near infrared absorbing properties. When the crystal size is at most 80 nm, the number average aggregated particle size of the near-infrared-absorbing particles can be controlled to be small, and the haze of the dispersion or the near-infrared-absorbing coating film formed by using it can be controlled to be low.

The crystal size is a value obtained by carrying out X-ray diffraction with respect to the near-infrared-absorbing particles, followed by calculation by means of a Scherrer's method.

In the present invention, the reasons for adopting, as A, an alkali metal, an alkaline earth metal or $NH_4$ are the following (i) to (iii).

(i) The crystal structure of crystallites in the near-infrared-absorbing particles of the present invention is a three dimensional network skeleton made of alternate bonding to $PO_4^{3-}$ and $Cu^{2+}$ and has spaces inside of the skeleton. The sizes of such spaces fit in well with ionic radii of alkali metal ions ($Li^+$: 0.90 Å, $Na^+$: 1.16 Å, $K^+$: 1.52 Å, $Rb^+$: 1.66 Å and $Cs^+$: 1.81 Å), alkaline earth metals ($Mg^{2+}$: 0.86 Å, $Ca^{2+}$: 1.14 Å, $Sr^{2+}$: 1.32 Å and $Ba^{2+}$: 1.49 Å) and $NH_4^+$ (1.66 Å), whereby the crystal structure can sufficiently be maintained.

(ii) Alkali metal ions, alkaline earth metals and $NH_4^+$ are able to be stably present as monovalent or bivalent cations in a solution, and therefore, in the process for producing near-infrared-absorbing particles, such cations tend to be readily taken into the crystal structure when a precursor for the compound ($A_{1/n}CuPO_4$) is formed.

(iii) Cations having strong coordinate bonding properties to $PO_4^{3-}$ (such as transition metal ions, etc.), are likely to present a crystal structure different from the crystal structure in the present invention exhibiting sufficient near-infrared-absorbing characteristics.

A is particularly preferably K, since the cation size is most suitable as an ion to be taken into the skeleton made of $PO_4^{3-}$ and $Cu^{2+}$, and it takes a thermodynamically stable structure.

Of the near-infrared-absorbing particles of the present invention, the change D in reflectance represented by the following formula (2) is preferably at most −0.41, more preferably at most −0.45:

$$D(\%/nm)=[R_{700}(\%)-R_{600}(\%)]/[700(nm)-600(nm)] \quad (2)$$

wherein $R_{700}$ is the reflectance at a wavelength of 700 nm in the diffuse reflection spectrum of the near-infrared-absorbing particles, and $R_{600}$ is the reflectance at a wavelength of 600 nm in the diffuse reflection spectrum of the near-infrared-absorbing particles.

In a diffuse reflection spectrum measurement in a case where particles have light absorbing properties, the light absorption intensity varies depending upon the light path length at the light absorption wavelength, and a weak absorption band in a transmission spectrum of a film containing particles, is observed to be relatively strong in the diffuse reflection spectrum. Therefore, in the calculation of a change in reflectance in this specification, reflectance values within a range of from 600 to 700 nm are used i.e. a range wherein the reflectance changes equally to the transmittance change in the transmission spectrum of a near-infrared-absorbing coating film containing the near-infrared-absorbing particles.

The reflectance of the near-infrared-absorbing particles being high indicates that light absorption by the near-infrared-absorbing particles is low, and the reflectance of the near-infrared-absorbing particles being low indicates that light absorption by the near-infrared-absorbing particles is high. That is, the reflectance of the near-infrared-absorbing particles serves as an index for the transmittance of the near-infrared-absorbing particles.

Accordingly, when the above change D in reflectance is at most −0.41, the change in transmittance in a wavelength range of from 630 to 700 nm of a near-infrared-absorbing coating film formed by using such particles, becomes sufficiently sharp, and such a near-infrared-absorbing coating film becomes suitable for e.g. a near-infrared-absorbing filter for a camera.

Further, of the near-infrared-absorbing particles of the present invention, the reflectance at a wavelength of 715 nm in the diffuse reflection spectrum is preferably at most 19%, more preferably at most 18%.

Further, of the near-infrared-absorbing particles of the present invention, the reflectance at a wavelength of 500 nm in the diffuse reflection spectrum is preferably at least 85%, more preferably at least 86%.

The diffuse reflection spectrum is measured by means of an ultraviolet-visible spectrophotometer with respect to powderstate near-infrared-absorbing particles.

The near-infrared-absorbing particles of the present invention can exhibit sufficient near-infrared-absorbing characteristics when the crystallites sufficiently maintain the crystal structure of $A_{1/n}CuPO_4$. Therefore, if water or hydroxy groups are attached to the surface of the crystallites, the crystal structure of $A_{1/n}CuPO_4$ tends to be hardly maintained, whereby the difference in transmittance between the visible light region and the near infrared region decreases, and a near-infrared-absorbing coating film formed by using such particles is not suitable for a near-infrared-absorbing filter for a camera.

Therefore, in the microscopic IR spectrum of the near-infrared-absorbing particles of the present invention, based on the absorption intensity (100%) of the peak in the vicinity of $1,000 cm^{-1}$ attributable to a phosphate group, it is preferred that the absorption intensity of a peak in the vicinity of $1,600 cm^{-1}$ attributable to water is at most 8%, and the absorption intensity of a peak in the vicinity of $3,750 cm^{-1}$ attributable to a hydroxy group is at most 26%, and it is more preferred that the absorption intensity of a peak in the vicinity of $1,600 cm^{-1}$ attributable to water is at most 5%, and the absorption intensity of a peak in the vicinity of $3,750 cm^{-1}$ attributable to a hydroxy group is at most 15%.

Here, the microscopic IR spectrum is measured by means of a Fourier transform infrared spectrophotometer with respect to powder-state near-infrared-absorbing particles. Specifically, for example, using Fourier transform infrared spectrophotometer Magna 760 manufactured by Thermo Fisher Scientific, from 50 to 100 μg of near-infrared-absorbing particles are put on its diamond plate and made flat by a roller, followed by measurement by means of the microscopic FT-IR method.

Further, in the near-infrared-absorbing particles of the present invention, if a crystal structure other than $A_{1/n}CuPO_4$, such as $A_{1/n}Cu_4(PO_4)_3$, increases, the change in transmittance in the wavelength range of from 630 to 700 nm of a near-infrared-absorbing coating film formed by using such particles becomes less, and such a near-infrared-absorbing coating film is not suitable for a near-infrared-absorbing filter for a camera.

Thus, it is necessary that by X-ray diffraction, it is identified that the particles consist essentially of crystallites of $A_{1/n}CuPO_4$.

As described in the foregoing, the near-infrared-absorbing particles of the present invention consist essentially of crystallites of a compound represented by $A_{1/n}CuPO_4$ and have a number average aggregated particle size of from 20 to 200 nm, whereby the transmittance in the visible light region is high, and the transmittance in the near infrared region is low, and in a near-infrared-absorbing coating film formed by using such particles, the transmittance sharply changes in the wavelength range of from 630 to 700 nm.

<Process For Producing Near-Infrared-Absorbing Particles>

The process for producing near-infrared-absorbing particles of the present invention is a process comprising the following steps (a) to (c):

(a) a step of mixing a salt containing $Cu^{2+}$ and a salt or organic substance containing $PO_4^{3-}$ in a molar ratio of $PO_4^{3-}$ to $Cu^{2+}$ ($PO_4^{3-}/Cu^{2+}$) being from 10 to 20, in the presence of $A^{n+}$, (b) a step of firing the product obtained in the above step (a) at from 560 to 760° C., and (c) a step of pulverizing the fired product obtained in the above step (b) so that the number average aggregated particle size becomes to be at most 200 nm, preferably from 20 to 200 nm.

(With Respect to Step (a))

The salt containing $Cu^{2+}$ may, for example, be copper (II) sulfate pentahydrate, copper (II) chloride dihydrate, copper (II) acetate monohydrate, copper (II) bromide or copper (II) nitrate trihydrate.

The salt or organic substance containing $PO_4^{3-}$ may, for example, be an alkali metal phosphate, an ammonium salt of phosphoric acid, an alkaline earth metal phosphate, or phosphoric acid.

The alkali metal phosphate or alkaline earth metal phosphate may, for example, be dipotassium hydrogen phosphate, potassium dihydrogen phosphate, potassium phosphate, disodium hydrogen phosphate dodecahydrate, sodium dihydrogen phosphate dihydrate, trisodium phosphate dodecahydrate, lithium phosphate, calcium hydrogen phosphate, magnesium hydrogen phosphate trihydrate or magnesium phosphate octahydrate.

The ammonium salt of phosphoric acid may, for example, be diammonium hydrogen phosphate, ammonium dihydrogen phosphate, sodium ammonium hydrogen phosphate tetrahydrate or ammonium phosphate trihydrate.

A method for permitting $A^{n+}$ to be present, may, for example, be a method for employing, as the salt containing $PO_4^{3-}$, an alkali metal phosphate, an ammonium salt of phosphoric acid or an alkaline earth metal phosphate, or a method of adding a salt containing $A^{n+}$ at the time of mixing the salt containing $Cu^{2+}$ and the salt or organic substance containing $PO_4^{3-}$.

The salt containing $A^{n+}$ may, for example, be an alkali metal hydroxide, an alkaline earth metal hydroxide, an alkali metal chloride, an alkaline earth metal chloride, an alkali metal bromide, an alkaline earth metal bromide, an alkali metal nitrate, an alkaline earth metal nitrate, an alkali metal carbonate, an alkaline earth metal carbonate, an alkali metal sulfate or an alkaline earth metal sulfate.

The mixing of the salt containing $Cu^{2+}$ and the salt or organic substance containing $PO_4^{3-}$ is preferably carried out in a solvent capable of dissolving the salt containing $Cu^{2+}$, the salt containing $PO_4^{3-}$ and, if necessary, the salt containing $A^{n+}$. As such a solvent, water is preferred.

The ratio between the salt containing $Cu^{2+}$ and the salt or organic substance containing $PO_4^{3-}$ is such a ratio that the molar ratio of $PO_4^{3-}$ to $Cu^{2+}$ (i.e. $PO_4^{3-}/Cu^{2+}$) becomes from 10 to 20, preferably from 12 to 18. When $PO_4^{3-}/Cu^{2+}$ is at least 10, $Av_{1/n}Cu_4(PO_4)_3$ will not be formed as a by-product at the time of firing in the step (b), or even if formed, the amount is such a level that the crystallites can sufficiently maintain the crystal structure of $A_{1/n}CuPO_4$, whereby the change in transmittance in the wavelength range of from 630 to 700 nm of the near-infrared-absorbing coating film containing the near-infrared-absorbing particles as the product becomes sufficiently sharp. When $PO_4^{3}/Cu^{2+}$ is at most 20, impurities other than $A_{1/n}CuPO_4$ will not be formed as by-products, at the time of firing in step (b), or even if formed as by-products, their amount is at such a level that the crystallites can sufficiently maintain the crystal structure of $A_{1/n}CuPO_4$, whereby the change in transmittance in the wavelength range of from 630 to 700 nm of a near-infrared-absorbing coating film containing the near-infrared-absorbing particles as the product, becomes sufficiently sharp.

The temperature at the time of mixing the salt containing $Cu^{2+}$ and the salt or organic substance containing $PO_4^{3-}$ is preferably from 10 to 95° C., more preferably from 15 to 40° C. If the temperature is too high, concentration of the solute takes place due to evaporation of the solvent, whereby impurities other than the desired product tend to be included. If the temperature is too low, the reaction rate tends to be low, and the reaction time tends to be long, such being undesirable from the viewpoint of efficiency of the process.

The above product is separated by e.g. filtration and then, as the case requires, subjected to cleaning, drying, or dry pulverization. With a view to preventing fixing of particles via water and preventing growth of particles at the time of firing in the step (b), it is preferred to clean the product with an organic solvent and to remove moisture contained in the product.

(With Respect to Step (b))

The firing temperature is from 560 to 760° C., more preferably from 580 to 750° C. When the firing temperature is at least 560° C., the crystal structure changes by a structural phase transition, and the crystal structure after the structural phase transition will be maintained even after being cooled to room temperature. When the firing temperature is at most 760° C., heat decomposition can be prevented.

Here, if the firing temperature is too low, the crystal structure may be different from the crystal structure in the case of firing within the above temperature range, whereby no adequate near-infrared-absorbing characteristics may be obtainable.

At the time of the firing, with a view to preventing growth of particles, it is preferred to let the object to be fired (the product obtained in the step (a)) flow. A rotary kiln furnace or the like may be mentioned as an apparatus whereby the object to be fired can be fired while letting it flow.

(With Respect to Step (c))

As the pulverization method, a known dry pulverization method or wet pulverization method may be mentioned, and a wet pulverization method is preferred, since it is thereby easy to bring the number average aggregated particle size to be from 20 to 200 nm.

As the dry pulverization method, a method of employing a ball mill, a jet mill, a mill type pulverizer or a mixer type pulverizer may, for example, be mentioned.

As the wet pulverizing method, a method of using a wet mill (such as a ball mill or a planetary mill), a crusher, a mortar, an impact pulverizing apparatus (such as nanomizer) or a wet microparticulation apparatus may, for example, be mentioned, and a method of using a wet microparticulation apparatus is preferred.

In the case of the wet pulverization method, it is necessary to disperse the fired product obtained in the step (b) in a dispersing medium to obtain a dispersion for pulverization.

As the dispersing medium, water, an alcohol, a ketone, an ether, an ester or an aldehyde may, for example, be mentioned. As the dispersing medium, one type may be used alone or two or more types may be used in combination. As the dispersing medium, water or an alcohol is preferred from the viewpoint of the operation environment, and in a case where a high pressure is put to the dispersion for pulverization, water is particularly preferred. The amount of the dispersing medium is preferably from 50 to 95 mass % based on the dispersion for pulverization (100 mass %), from the viewpoint of maintaining the dispersibility of the fired product.

The pulverized product is, as the case requires, separated from the dispersion by e.g. centrifugal separation, followed by cleaning, drying or dry pulverization.

The drying method may, for example, be a heat drying method, a spray drying method, a freeze drying method or a vacuum drying method.

The near-infrared-absorbing particles obtained as described above may be subjected to surface treatment by a known method for the purpose of improving the weather resistance, acid resistance, water resistance, etc., or improving the compatibility with a binder resin by surface modification.

The method for surface treatment may, for example, be a method (wet method) wherein a surface treating agent or a surface treating agent diluted with a solvent is added to the dispersion containing the near-infrared-absorbing particles, followed by stirring for treatment, and then the solvent is removed for drying, or a method (dry method) wherein a surface treating agent or a surface treating agent diluted with a solvent is sprayed with dry air or nitrogen gas, while stirring the near-infrared-absorbing particles for treatment, followed by drying.

As the surface treating agent, a surfactant or a coupling agent may, for example, be mentioned.

The above-described process for producing near-infrared-absorbing particles of the present invention comprises the above-described steps (a) to (c), whereby it is possible to obtain near-infrared-absorbing particles having a high transmittance in the visible light region and a low transmittance in the near infrared region. By incorporating the near-infrared-absorbing particles thus produced into a coating film, it is possible to obtain a near-infrared-absorbing coating film, of which the transmittance sharply changes in a wavelength range of from 630 to 700 nm.

<Applications>

The near-infrared-absorbing particles of the present invention may be used as a dispersion by dispersing them in a dispersing medium, or may be used as a resin composition by dispersing them in a resin.

Now, the dispersion will be described.

<Dispersion>

The dispersion of the present invention comprises a dispersing medium and the near-infrared-absorbing particles of the present invention dispersed in the dispersing medium, and may contain a dispersant, a binder resin or another light absorbing material, as the case requires.

The amount of the near-infrared-absorbing particles is preferably from 10 to 60 mass % in the solid content (100 mass %) of the dispersion. When the amount of the near-infrared-absorbing particles is at least 10 mass %, sufficient near-infrared-absorbing characteristics can be obtained. When the amount of the near-infrared-absorbing particles is at most 60 mass %, the transmittance in the visible light region can be maintained to be high.

(Dispersing Medium)

As the dispersing medium, water, an alcohol, a ketone, an ether, an ester, an aldehyde, an amine, an aliphatic hydrocarbon, an alicyclic hydrocarbon or an aromatic hydrocarbon may, for example, be mentioned. As the dispersing medium, one type may be used alone, or two or more types may be used in combination. As the dispersing medium, water or an alcohol is preferred from the viewpoint of the operation environment. The amount of the dispersing medium is preferably from 40 to 90 mass % in the dispersion (100 mass %) from the viewpoint of maintaining the dispersibility of the near-infrared-absorbing particles.

(Dispersant)

The dispersant may, for example, be one showing a modifying effect to the surface of the near-infrared-absorbing particles, such as, a surfactant, a silane-type coupling agent, a silicone resin, a titanate-type coupling agent, an aluminum-type coupling agent or a zircoaluminate-type coupling agent.

The surfactant may, for example, be an anionic surfactant (such as a special polycarboxylic acid type high molecular weight surfactant, an alkyl phosphate ester or the like), a nonionic surfactant (such as a polyoxyethylene alkyl ether, a polyoxyethylene alkyl phenol ether, a polyoxyethylene carboxylic acid ester, a sorbitan higher carboxylic acid ester, or the like), a cationic surfactant (such as a polyoxyethylene alkylamine carboxylic acid ester, an alkylamine, an alkylammonium salt, or the like) or an amphoteric surfactant (such as a higher alkyl betaine or the like).

As the silane of the silane type coupling agent, chlorosilane, alkoxysilane or silazane may be mentioned. As the silane coupling agent, an alkoxysilane having a functional group (such as a glycidoxy group, a vinyl group, an amino group, an alkenyl group, an epoxy group, a mercapto group, a chloro group, an ammonium group, an acryloxy group, a methacryloxy group or the like) may, for example, be mentioned as a typical example.

As the silicone resin, a methyl silicone resin or a methyl phenyl silicone resin may be mentioned.

As the titanate type coupling agent, one having an acyloxy group, a phosphoxy group, a pyrophosphoxy group, a sulfoxy group, an allyloxy group or the like may be mentioned.

As the aluminum type coupling agent, acetoalkoxy aluminum diisopropylate may be mentioned.

As the zircoaluminate type coupling agent, one having an amino group, a mercapto group, an alkyl group, an alkenyl group or the like may be mentioned.

The amount of the dispersant varies depending upon the type of the dispersant, but is preferably from 0.5 to 10 mass % in the dispersion (100 mass %). When the amount of the dispersant is within such a range, the dispersibility of the near-infrared-absorbing particles will be good, the transparency will not be impaired, and it is possible to prevent sedimentation of the near-infrared-absorbing particles with time.
(Binder Resin)

The binder resin may, for example, be a thermoplastic resin (such as a polyester resin, an acrylic resin, a polycarbonate resin, a polyamide resin, an alkyd resin, or the like) or a thermosetting resin (such as an epoxy resin, a thermosetting acrylic resin, a silsesquioxane resin, or the like). In a case where transparency is required for the near-infrared-absorbing coating film, the binder resin is preferably an acrylic resin or a polyester resin. The amount of the binder resin is preferably from 40 to 90 mass % in the solid content (100 mass %) of the dispersion.
(Other Light-Absorbing Materials)

As other light-absorbing materials, an ultraviolet-absorbing material, other infrared-absorbing materials, etc. may be mentioned. The ultraviolet-absorbing material may, for example, be zinc oxide, titanium oxide, cerium oxide, zirconium oxide, mica, kaolin, sericite or the like.

Other infrared-absorbing materials may, for example, be ITO (Indium Tin Oxide), ATO (Antimony doped Tin Oxide), etc. ITO has a high transmittance in the visible light region and has a wide range of electromagnetic wave absorbing properties including a radio region exceeding 1,100 nm, and accordingly, it is particularly preferred in a case where a radio shielding property is required.

The number average aggregated particle size of other light-absorbing materials is preferably at most 100 nm from the viewpoint of the transparency.
(Preparation of Dispersion)

The dispersion of the present invention can be prepared by mixing the near-infrared-absorbing particles of the present invention, the dispersing medium and, as the case requires, a dispersant, a binder resin, etc., followed by stirring by means of a rotation/revolution type mixer, a beads mill, a planetary mill or a supersonic homogenizer. In order to preserve high transparency, sufficient stirring is required. The stirring may be carried out continuously or intermittently.

The above-described dispersion of the present invention is one having the near-infrared-absorbing particles of the present invention dispersed in a dispersion medium, whereby the transmittance in the visible light region is high, and the transmittance in the near infrared region is low, and it is useful for the formation of a near-infrared-absorbing coating film wherein the transmittance sharply changes in the wavelength range of from 630 to 700 nm.
<Article Having Near-Infrared-Absorbing Coating Film>

The article having a near-infrared-absorbing coating film of the present invention is one having a near-infrared-absorbing coating film containing the near-infrared-absorbing particles of the present invention, on a substrate surface. Such an article having a near-infrared-absorbing coating film is obtained by applying the dispersion of the present invention to the surface of a substrate, followed by drying.

The article having a near-infrared-absorbing coating film may, for example, be a near infrared filter for a camera, an optical filter for a plasma display, a glass window for a vehicle (such as an automobile) or a lamp.

The shape of the substrate may be a film or a sheet. The material for the substrate may, for example, be glass, a polyethylene terephthalate (PET), an acrylic resin, an urethane resin, a polycarbonate, a polyethylene, an ethylene/vinyl acetate copolymer, a vinyl chloride resin or a fluoro resin, and glass is preferred from the viewpoint of the transparency and the heat resistance.

In the near-infrared-absorbing coating film, the change D' in transmittance represented by the following formula (3) is preferably at most −0.36, more preferably at most −0.37:

$$D'(\%/nm) = [T_{700}(\%) - T_{630}(\%)]/[700(nm) - 630(nm)] \quad (3)$$

wherein $T_{700}$ is the transmittance at a wavelength of 700 nm of the near-infrared-absorbing coating film, and $T_{630}$ is the transmittance at a wavelength of 630 nm of the near-infrared-absorbing coating film.

When the change D' in transmittance is at most −0.36, the change in transmittance in the wavelength range of from 630 to 700 nm becomes sufficiently sharp, such being suitable for a near-infrared-absorbing filter for a camera.

Further, the transmittance at a wavelength of 715 nm of the near-infrared-absorbing coating film is preferably at most 10%, more preferably at most 5%.

Further, the transmittance at a wavelength of 500 nm of the near-infrared-absorbing coating film is preferably at least 80%, more preferably at least 85%.

The transmittance of the near-infrared-absorbing coating film is measured by means of an ultraviolet visible spectrophotometer with respect to a near-infrared-absorbing coating film having a thickness of 20 μm, which is prepared by coating a glass substrate with a dispersion containing 50 mass % of the near-infrared-absorbing particles and 50 mass % of a binder resin, as a solid content.

EXAMPLES

Now, the present invention will be described with reference to Examples, but it should be understood that the present invention is by no means restricted to these Examples.

Examples 1, 7 to 10, 16 to 19, 24, and 26 to 29 represent Production Examples to obtain fired products of near-infrared-absorbing particles by the above-described steps (a) to (b) relating to the process for producing near-infrared-absorbing particles of the present invention. Examples 2 to 6, 11 to 14, and 30 to 33 are Working Examples of the present invention, Example 20 is a Reference Example, and Examples 15, 21 to 23 and 25 are Comparative Examples.
(X-Ray Diffraction)

With respect to powder-state near-infrared-absorbing particles, X-ray diffraction measurement was carried out by means of a X-ray diffraction apparatus (RINT-TTR-III, manufactured by Rigaku Corporation) to carry out identification of the crystal structure. Further, the crystal size was obtained by calculation by a Scherrer's method with respect to the reflection at $2\theta = 14°$.
(Number Average Aggregated Particle Size)

With respect to a dispersion for measuring particle size having near-infrared-absorbing particles dispersed in water (solid content concentration: 5 mass %), the number average aggregated particle size was measured by means of a dynamic light scattering particle size distribution measuring apparatus (Microtrack Ultrafine Particle Size Analyzer UPA-150, manufactured by Nikkiso Co., Ltd.).
(Reflectance)

With respect to powder-state near-infrared-absorbing particles, the diffuse reflection spectrum (reflectance) was measured by means of an ultraviolet visible spectrophotometer (U-4100 model, manufactured by Hitachi High-Technologies Corporation). Barium sulfate was used as the base line.

(Transmittance)

With respect to a near-infrared-absorbing coating film, the transmission spectrum (transmittance) was measured by means of an ultraviolet visible spectrophotometer (U-4100 model, manufactured by Hitachi High-Technologies Corporation).

(Haze)

With respect to the near-infrared-absorbing coating film used for the measurement of the transmittance, the haze was measured by means of a haze meter (Haze-gard plus, manufactured by BYK Gardner).

Example 1

A fired product and a pulverized produce were obtained by the following steps (a) to (b).

Step (a):

To 500 g of a 52 mass % dipotassium hydrogen phosphate (manufactured by Junsei Chemical Co., Ltd.) aqueous solution, 500 g of a 5 mass % copper sulfate pentahydrate (manufactured by Junsei Chemical Co., Ltd.) aqueous solution was added with stirring, followed by stirring at room temperature for at least 5 hours. $PO_4^{3-}/Cu^{2+}$ (molar ratio) is shown in Table 1.

From the obtained light-blue solution, the product was separated by suction filtration and washed with water and acetone to obtain a light-blue product. The product was transferred to a crucible and vacuum-dried at 100° C. for two hours. With respect to the dried product, dry pulverization for 30 minutes was carried out twice by means of a wonder blender (manufactured by Osaka Chemical Co., Ltd.).

Step (b):

A powder-state product was transferred to a crucible and fired at 600° C. for 8 hours in the atmosphere to obtain a yellowish green fired product. With respect to the fired product, dry pulverization for 30 seconds was carried out twice by means of a wonder blender. The obtained yellowish green fired product was 15.4 g, and the yield was 78% based on the number of moles of the copper sulfate pentahydrate.

With respect to the fired product, X-ray diffraction was measured. The results are shown in FIG. 1. From the results of X-ray diffraction, the crystal structure of $KCuPO_4$ was confirmed, and the fired product was identified to be particles consisting essentially of crystallites of $KCuPO_4$.

Example 2

Example of Step (c):

The fired product in Example 1 was dispersed in water to obtain a dispersion having a solid content concentration of 10 mass %, which was treated by an ultrasonic homogenizer, and then wet pulverization was carried out by means of a wet microparticulation apparatus (Starburst Mini, manufactured by Sugino Machine Limited). The number of times when the dispersion passed through the orifice diameter is taken as the number of times of wet pulverization treatment. In this Example, the number of times of wet pulverization treatment was 50 times.

From the dispersion after the wet pulverization, the pulverized product was separated by centrifugal separation and transferred to a crucible, and then dried at 150° C. to obtain a yellowish green pulverized product. With respect to the pulverized product, dry pulverization for 30 seconds was carried out twice by means of a wonder blender to obtain a pulverized product.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites is shown in Table 1.

Further, a dispersion for measuring particle size of the obtained near-infrared-absorbing particles was prepared, and the number average aggregated particle size was measured. The results are shown in Table 1.

Figure 2:
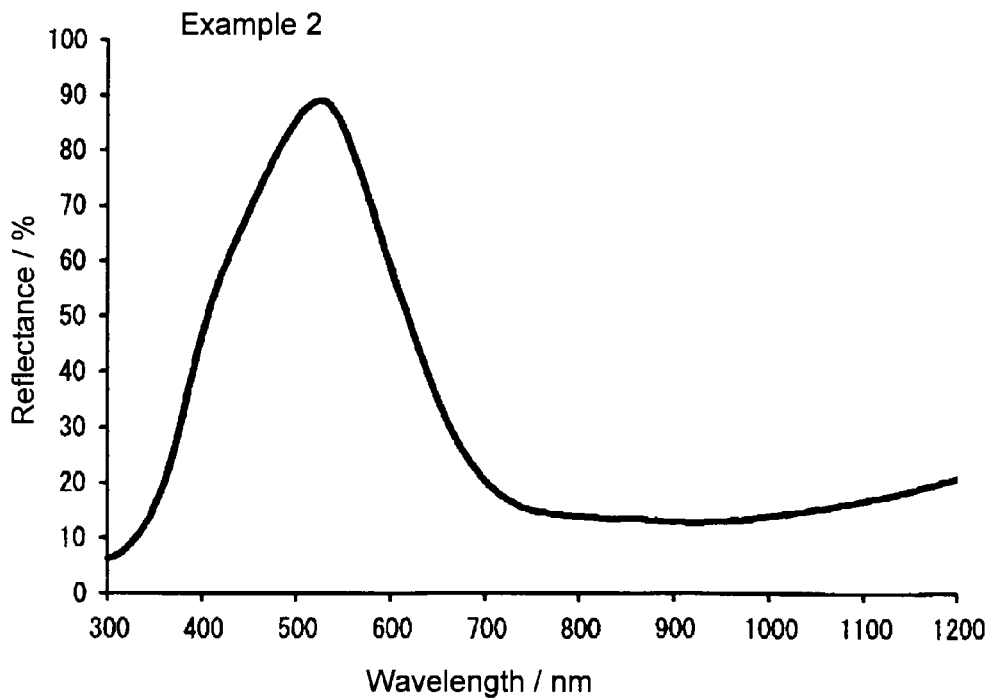
FIG. 2 is the diffuse reflection spectrum of the near-infrared-absorbing particles in Example 2.

Further, the diffuse reflection spectrum (reflectance) of the near-infrared-absorbing particles was measured. The results are shown in Table 1. Further, the diffuse reflection spectrum is shown in FIG. 2.

Example for Preparing Dispersion and Coating Film:

The near-infrared-absorbing particles and a cyclohexanone solution containing 30 mass % of a polyester resin (Vylon 103, manufactured by Toyobo Co., Ltd.) were mixed in such a ratio that the solid content became 50 mass % of the near-infrared-absorbing particles and 50 mass % of the polyester resin, followed by stirring by a rotation/revolution type mixer to obtain a dispersion. Such a dispersion was applied to a glass substrate (a slide glass) and heated at 150° C. for 15 minutes to form a near-infrared-absorbing coating film having a thickness of 20 μm. With respect to such a near-infrared-absorbing coating film, the transmittance and the haze were measured. The results are shown in Table 1.

Example 3

Example for Change of Condition in Step (c):

A pulverized product was obtained in the same manner as in Example 2 except that the number of times of wet pulverization treatment was changed to 30 times.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be the near-infrared-absorbing particles consisting essentially of crystallites $KCuPO_4$. Further, the size of the crystallites is shown in Table 1.

Further, a dispersion for measuring the particle size of the obtained near-infrared-absorbing particles was prepared, and the number average aggregated particle size was measured. The results are shown in Table 1.

Figure 3:
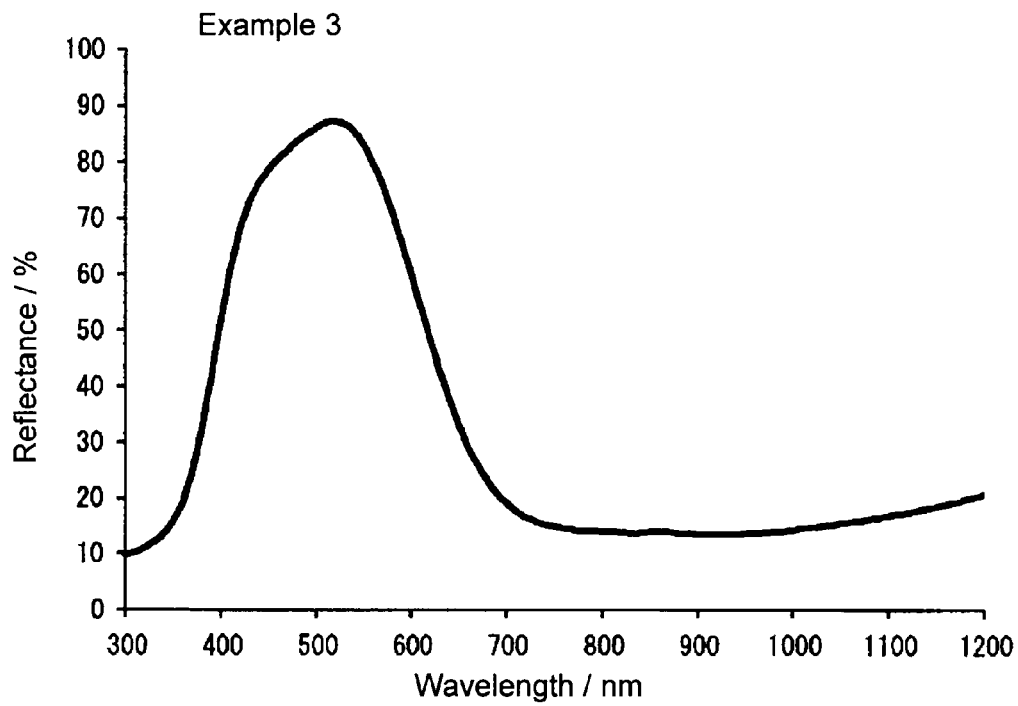
FIG. 3 is the diffuse reflection spectrum of the near-infrared-absorbing particles in Example 3.

Further, the diffuse reflection spectrum (reflectance) of the near-infrared-absorbing particles was measured. The results are shown in Table 1. Further, the diffuse reflection spectrum is shown in FIG. 3.

Examples for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 1.

Example 4

Example for Change of Condition in Step (c):

A pulverized product was obtained in the same manner as in Example 2 except that the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites is shown in Table 1.

Further, a dispersion for measuring the particle size of the obtained near-infrared-absorbing particles was prepared, and the number average aggregated particle size was measured. The results are shown in Table 1.

Further, the diffuse reflection spectrum (reflectance) of the near-infrared-absorbing particles was measured. The results are shown in Table 1.

Example for Preparation of Dispersion and Coating Film:

A dispersion and a near-infrared-absorbing coating film were obtained in the same manner as in Example 2 except that the near-infrared-absorbing particles were changed. With respect to the near-infrared-absorbing coating film, the transmittance and the haze were measured. The results are shown in Table 1.

Example 5

Example for Change of Condition in Step (c):

A pulverized product was obtained in the same manner as in Example 2 except that the number of times of wet pulverization treatment was changed to 10 times.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites are shown in Table 1.

Figure 4:
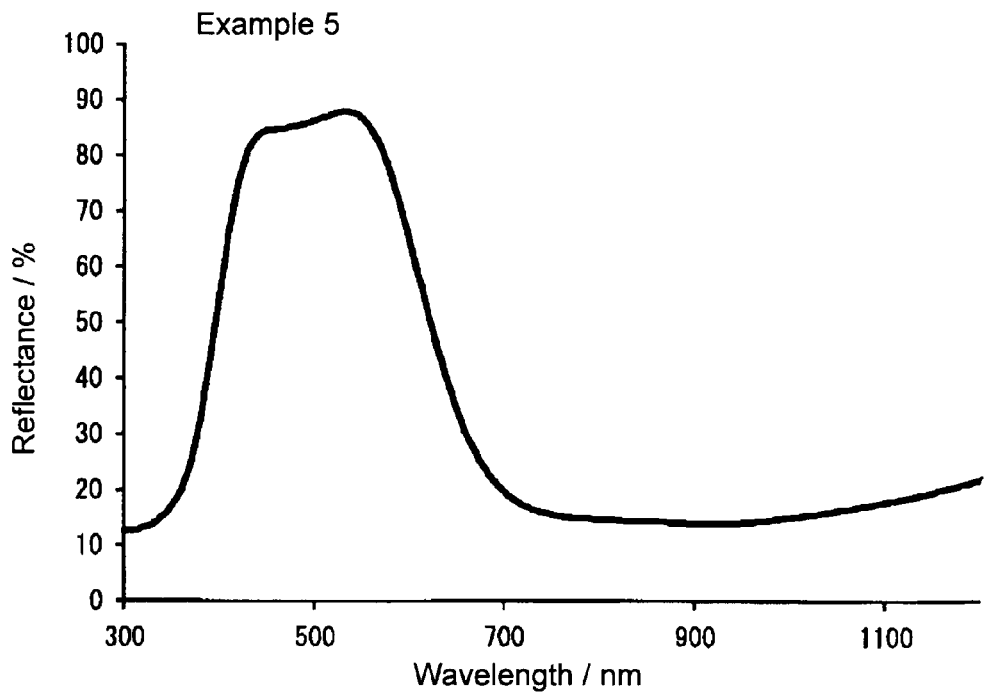
FIG. 4 is the diffuse reflection spectrum of the near-infrared-absorbing particles in Example 5.

Further, a dispersion for measuring the particle size of the obtained near-infrared-absorbing particles was prepared, and the number average aggregated particle size was measured. The results are shown in Table 1. Further, the diffuse reflection spectrum (reflectance) of the near-infrared-absorbing particles was measured. The results are shown in Table 1. Further, the diffuse reflection spectrum is shown in FIG. 4.

Figure 5:
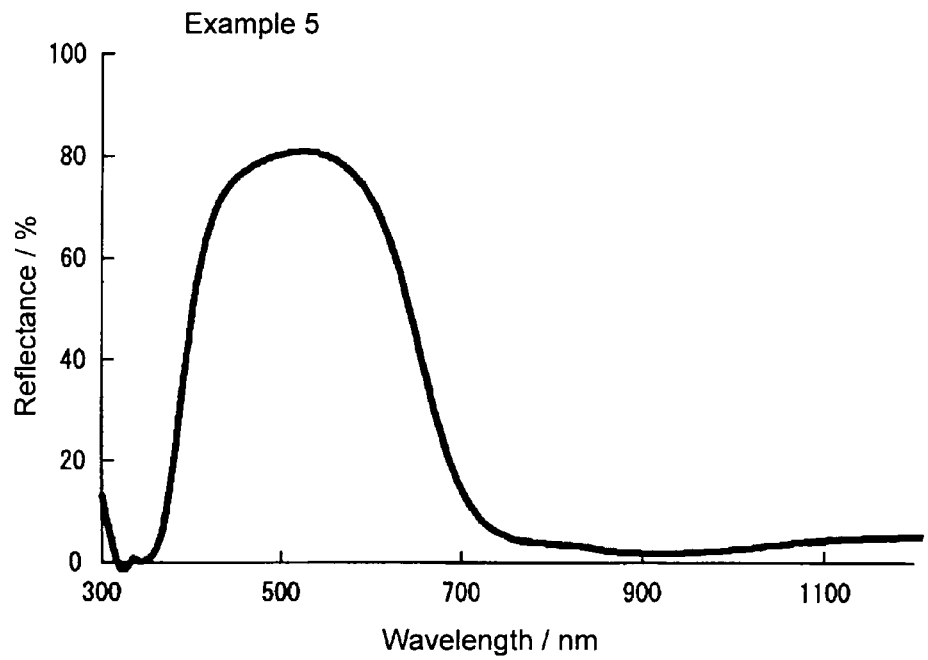
FIG. 5 is the transmission spectrum of the near-infrared-absorbing coating film in Example 5.

Example for Preparation of Dispersion and Coating Film:

A dispersion and a near-infrared-absorbing coating film were obtained in the same manner as in Example 2 except that the near-infrared-absorbing particles were changed. With respect to the near-infrared-absorbing coating film, the transmittance and the haze were measured. The results are shown in Table 1. Further, the transmission spectrum is shown in FIG. 5.

Example 6

Example for Change of Condition in Step (c):

A pulverized product was obtained in the same manner as in Example 2 except that the number of times of wet pulverization treatment was changed to eight times.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites is shown in Table 1. Further, a dispersion for measuring the particle size of the obtained near-infrared-absorbing particles was prepared, and the number average aggregated particle size was measured. The results are shown in Table 1.

Further, the diffusion reflection spectrum (reflectance) of the near-infrared-absorbing particles was measured. The results are shown in Table 1.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 1.

Example 7

Example for Change in Steps (a) to (b):

A fired product was obtained in the same manner as in Example 1 except that to 500 g of a 52 mass % dipotassium hydrogen phosphate (manufactured by Junsei Chemical Co., Ltd.) aqueous solution, 500 g of a 5 mass % copper sulfate pentahydrate (manufactured by Junsei Chemical Co., Ltd.) aqueous solution and lithium hydroxide monohydrate in an amount equimolar to copper sulfate pentahydrate, were added with stirring.

Example 8

Example for Change in Steps (a) to (b):

A fired product was obtained in the same manner as in Example 1 except that to 500 g of a 52 mass % dipotassium hydrogen phosphate (manufactured by Junsei Chemical Co., Ltd.) aqueous solution, 500 g of a 5 mass % copper sulfate pentahydrate (manufactured by Junsei Chemical Co., Ltd.) aqueous solution and rubidium hydroxide in an amount equimolar to copper sulfate pentahydrate, were added with stirring.

Example 9

Example for Change in Steps (a) to (b):

A fired product was obtained in the same manner as in Example 1 except that to 500 g of a 52 mass % dipotassium hydrogen phosphate (manufactured by Junsei Chemical Co., Ltd.) aqueous solution, 500 g of a 5 mass % copper sulfate pentahydrate (manufactured by Junsei Chemical Co., Ltd.) aqueous solution and magnesium hydroxide in an amount equimolar to copper sulfate pentahydrate, were added with stirring.

Example 10

Example for Change in Steps (a) to (b):

A fired product was obtained in the same manner as in Example 1 except that instead of 500 g of the 52 mass % dipotassium hydrogen phosphate (manufactured by Junsei Chemical Co., Ltd.) aqueous solution, 500 g of a 40 mass % diammonium hydrogen phosphate (manufactured by Junsei Chemical Co., Ltd.) aqueous solution was used.

Example 11

Example for Change in Step (c):

A pulverized product was obtained in the same manner as in Example 2 except that using the fired product in Example 7 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of LiCuPO$_4$ was confirmed, and the pulverized product was identified to be near-infrared-absorbing particles consisting essentially of crystallites of LiCuPO$_4$. Further, the size of the crystallites is shown in Table 2.

Further, a dispersion for measuring the particle size of the obtained near-infrared-absorbing particles was prepared, and the number average aggregated particle size was measured. The results are shown in Table 2.

Further, the diffuse reflection spectrum (reflectance) of the near-infrared-absorbing particles was measured. The results are shown in Table 2.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 2.

Example 12

Example for Change in Step (c):

A pulverized product was obtained in the same manner as in Example 2 except that using the fired product in Example 8 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of RbCuPO$_4$ was confirmed, and the pulverized product was identified to be near-infrared-absorbing particles consisting essentially of crystallites of RbCuPO$_4$. Further, the size of the crystallites is shown in Table 2.

Further, a dispersion for measuring the particle size of the obtained near-infrared-absorbing particles was prepared, and the number average aggregated particle size was measured. The results are shown in Table 2.

Further, the diffuse reflection spectrum (reflectance) of the near-infrared-absorbing particles was measured. The results are shown in Table 2.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 2.

Example 13

Example for Change in Step (c):

A pulverized product was obtained in the same manner as in Example 2 except that using the fired product in Example 9 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of Mg$_{0.5}$CuPO$_4$ was confirmed, and the pulverized product was identified to be near-infrared-absorbing particles consisting essentially of crystallites of Mg$_{0.5}$CuPO$_4$. Further, the size of the crystallites is shown in Table 2.

Further, a dispersion for measuring the particle size of the obtained near-infrared-absorbing particles was prepared, and the number average aggregated particle size was measured. The results are shown in Table 2.

Further, the diffuse reflection spectrum (reflectance) of the near-infrared-absorbing particles was measured. The results are shown in Table 2.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 2.

Example 14

Example for Change in Step (c):

A pulverized product was obtained in the same manner as in Example 2 except that using the fired product in Example 10 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of NH$_4$CuPO$_4$ was confirmed, and the pulverized product was identified to be near-infrared-absorbing particles consisting essentially of crystallites of NH$_4$CuPO$_4$. Further, the size of the crystallites is shown in Table 2.

Further, a dispersion for measuring the particle size of the obtained near-infrared-absorbing particles was prepared, and the number average aggregated particle size was measured. The results are shown in Table 2.

Further, the diffuse reflection spectrum (reflectance) of the near-infrared-absorbing particles was measured. The results are shown in Table 2.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 2.

Example 15

Example for Change in Step (c):

A pulverized product was obtained in the same manner as in Example 2 except that the number of times of wet pulverization treatment was changed to 5 times.

Analysis/Measurement to Ascertain Pulverized Product:

With respect to the pulverized product, X-ray diffraction was measured. From the results of the X-ray diffraction, the crystal structure of KCuPO$_4$ was confirmed, and the pulverized product was identified to be near-infrared-absorbing particles consisting essentially of crystallites of KCuPO$_4$. Further, the size of the crystallites is shown in Table 3.

Further, a dispersion for measuring the particle size of the obtained near-infrared-absorbing particles was prepared, and the number average aggregated particle size was measured. The results are shown in Table 3.

Further, the diffuse reflection spectrum (reflectance) of the near-infrared-absorbing particles was measured. The results are shown in Table 3.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 3.

Example 16

Example for Change in Step (c):

The yellowish green fired product in Example 1 was dispersed in cyclohexanone to obtain a dispersion having a solid content concentration of 9 mass %, and wet pulverization was carried out for 233 hours by means of a ball mill.

From the dispersion after the wet pulverization, the pulverized product was separated by centrifugal separation and transferred to a crucible and dried at 150° C. to obtain a green pulverized product.

With respect to the yellowish green fired product in Example 1 and the green pulverized product after the ball milling in Example 16, the microscopic IR spectra were measured, whereby with respect to the yellowish green fired product in Example 1, based on the absorption intensity (100%) of the peak in the vicinity of 1,000 cm$^{-1}$ attributable to a phosphate group, the absorption intensity of the peak in the vicinity of 1,600 cm$^{-1}$ attributable to water was 2.0%, and the absorption intensity of the peak in the vicinity of 3,750 cm$^{-1}$ attributable to a hydroxy group was 9.6%. On the other hand, with respect to the green pulverized product after ball milling in Example 16, absorptions attributable to water and hydroxy group were confirmed, and based on the absorption intensity (100%) of the peak in the vicinity of 1,000 cm$^{-1}$ attributable to a phosphate group, the absorption intensity of the peak in the vicinity of 1,600 cm$^{-1}$ attributable to water was 8.7%, and the absorption intensity of the peak in the vicinity of 3,750 cm$^{-1}$ attributable to a hydroxy group was 26.7%.

Figure 6:
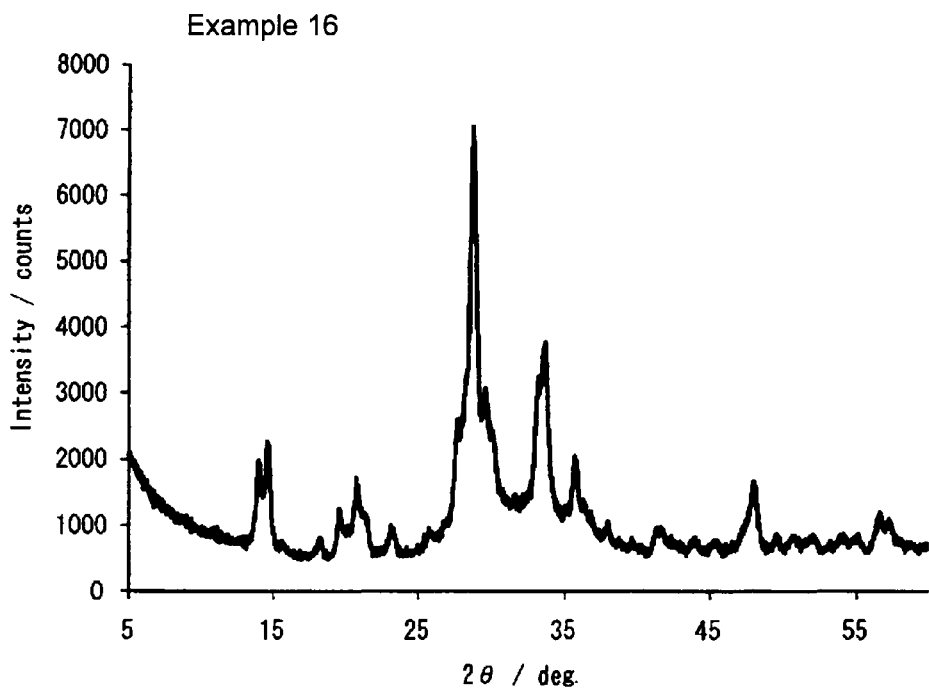
FIG. 6 is a graph showing the results of X-ray diffraction of the pulverized product in Example 16.

With respect to the green pulverized product after ball milling, X-ray diffraction was measured. The results are shown in FIG. 6. The peak position was similar to Example 1, but on the whole, the peak was broad. Further, at 2θ=14.2°, 35.7°, etc. peaks not observed in Example 1, were observed. This shows that due to deposition of water, the crystal structure was disintegrated, and KCuPO$_4$ was no longer the main crystal structure.

Example 17

Example for Change in Steps (a) to (b):

A yellowish green fired product was obtained in the same manner as in Example 1 except that the mixing ratio of the starting materials in the step (a) in Example 1 was changed so that PO$_4^{3-}$/Cu$^{2+}$ (molar ratio) became 7.

Figure 7:
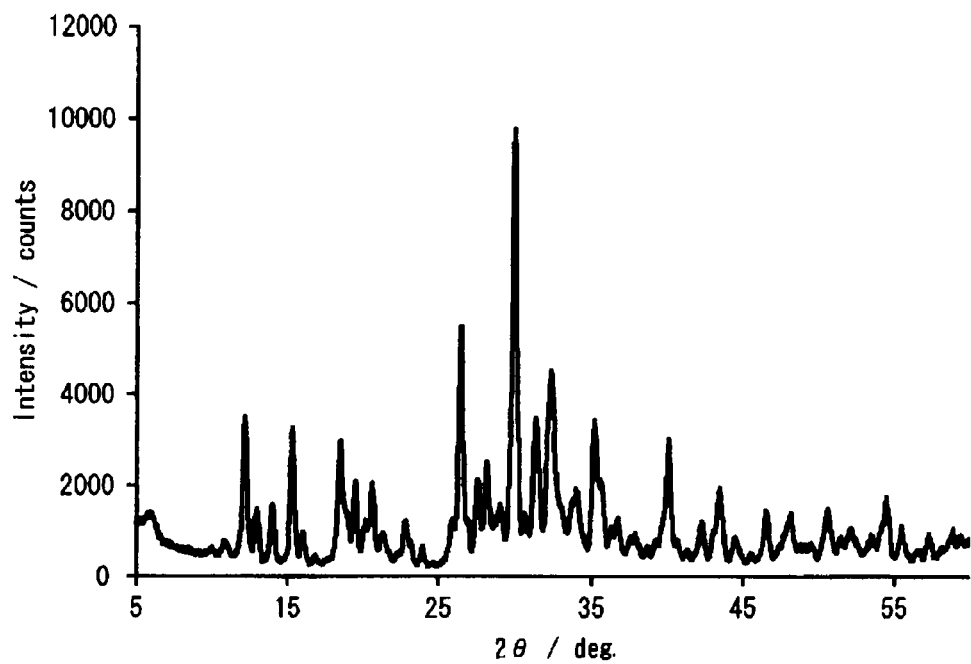
FIG. 7 is a graph showing the results of X-ray diffraction of the fired product in Example 17.

With respect to the fired product, X-ray diffraction was measured. The results are shown in FIG. 7. Many peaks not observed in Example 1 were observed (e.g. at 2θ=12.5°, 12.8°, 15.3°, etc.). The X-ray diffraction in Example 17 is similar to the diffraction pattern of KCu$_4$(PO$_4$)$_3$ reported in the past, and therefore, the main component was identified to be KCu$_4$(PO$_4$)$_3$.

Example 18

Example for Change in Steps (a) to (b):

A yellowish green fired product was obtained in the same manner as in Example 1 except that the mixing ratio of the raw materials in the step (a) in Example 1 was changed so that PO$_4^{3-}$/Cu$^{2+}$ (molar ratio) became 0.5.

With respect to the fired product, X-ray diffraction was measured. Also the X-ray diffraction in Example 18 was similar to the diffraction pattern of KCQPO$_4$)$_3$ reported in the past, and therefore, the main component was assumed to be KCu$_4$(PO$_4$)$_3$.

Example 19

Example for Change in Steps (a) to (b):

A fired product was obtained in the same manner as in Example 1 except that to 500 g of a 52 mass % dipotassium hydrogen phosphate (manufactured by Junsei Chemical Co., Ltd.) aqueous solution, 500 g of a 5 mass % copper sulfate pentahydrate (manufactured by Junsei Chemical Co., Ltd.) aqueous solution and tetraethyl ammonium chloride in an amount equimolar to the copper sulfate tetrahydrate, were added with stirring. In this Example, PO$_4^{3-}$/Cu$^{2+}$ (molar ratio) was 0.5.

Example 20

Example for Change in Step (c):

A pulverized product was obtained in the same manner as in Example 2 except that using the fired product in Example 16 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the pulverized product was confirmed to be such that due to deposition of water, the crystal structure disintegrated, and KCuPO$_4$ was no longer the main crystal structure. Further, the size of the crystallites is shown in Table 3. Further, a dispersion for measuring the particle size of the obtained near-infrared-absorbing particles was prepared, and the number average aggregated particle size was measured. The results are shown in Table 3.

Figure 8:
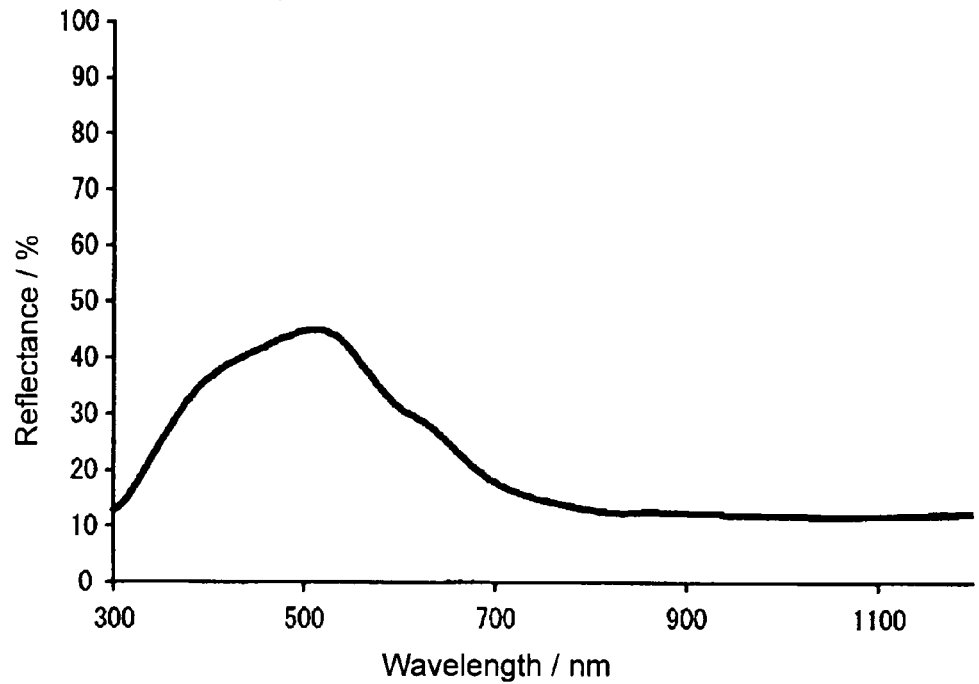
FIG. 8 is the diffuse reflection spectrum of the near-infrared-absorbing particles in Example 20.

Further, the diffuse reflection spectrum (reflectance) of the near-infrared-absorbing particles was measured. The results are shown in Table 3. Further, the diffuse reflection spectrum is shown in FIG. 8.

Figure 9:
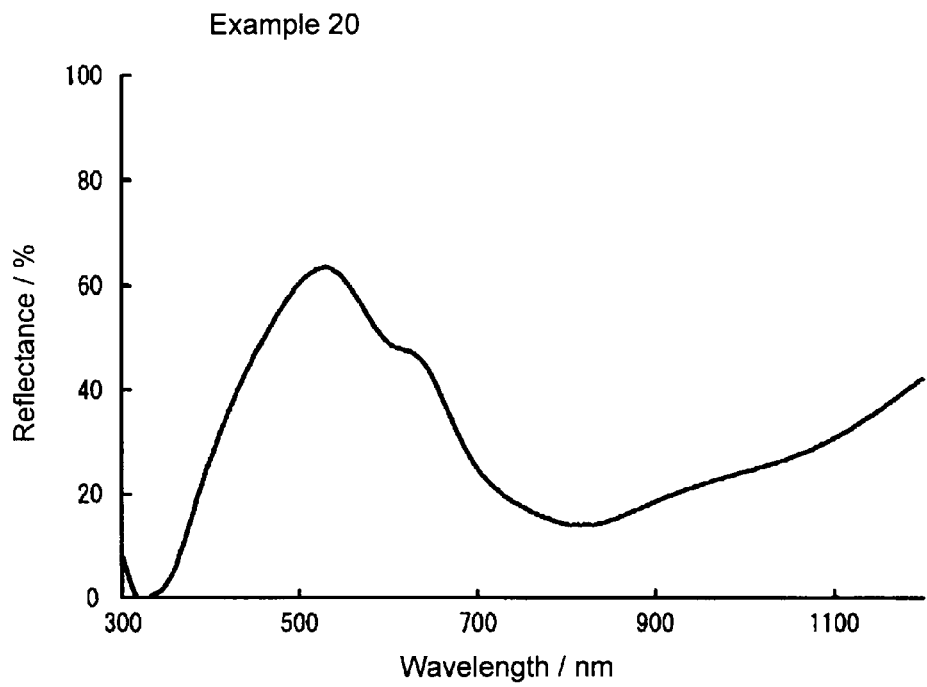
FIG. 9 is the transmission spectrum of the near-infrared-absorbing coating film in Example 20.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 3. Further, the transmission spectrum is shown in FIG. 9.

Example 21

Example for Change in Step (c):

A pulverized product was obtained in the same manner as in Example 2 except that using the fired product in Example 17 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the main component of the pulverized product was identified to be KCu$_4$(PO$_4$)$_3$. Further, the size of the crystallites is shown in Table 3.

Further, a dispersion for measuring the particle size of the obtained near-infrared-absorbing particles was prepared, and the number average aggregated particle size was measured. The results are shown in Table 3.

Figure 10:
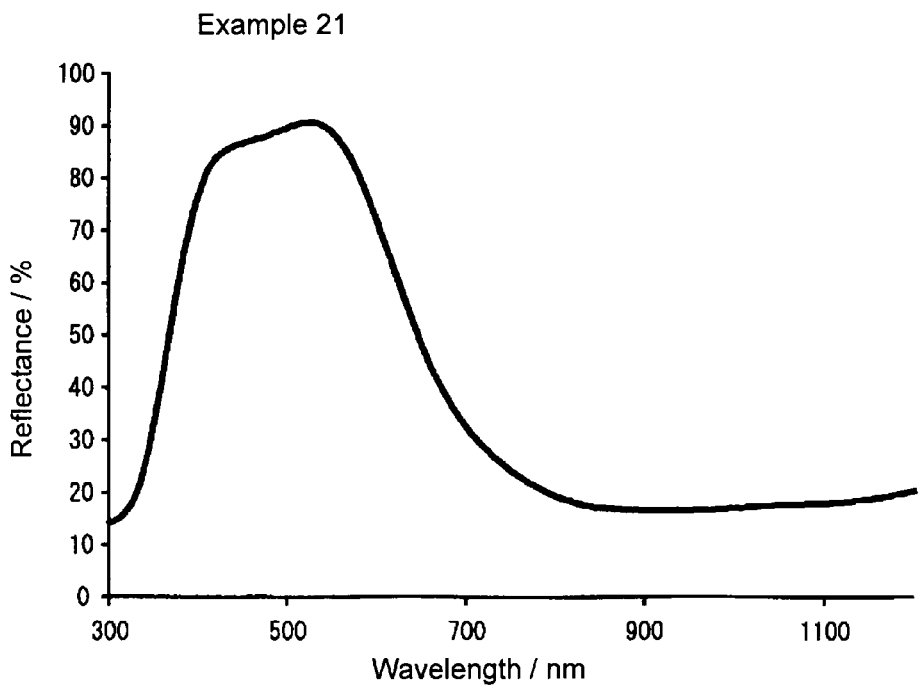
FIG. 10 the diffuse reflection spectrum of the near-infrared-absorbing particles in Example 21.

Further, the diffuse reflection spectrum (reflectance) of the near-infrared-absorbing particles was measured. The results are shown in Table 3. Further, the diffuse reflection spectrum is shown in FIG. 10.

Figure 11:
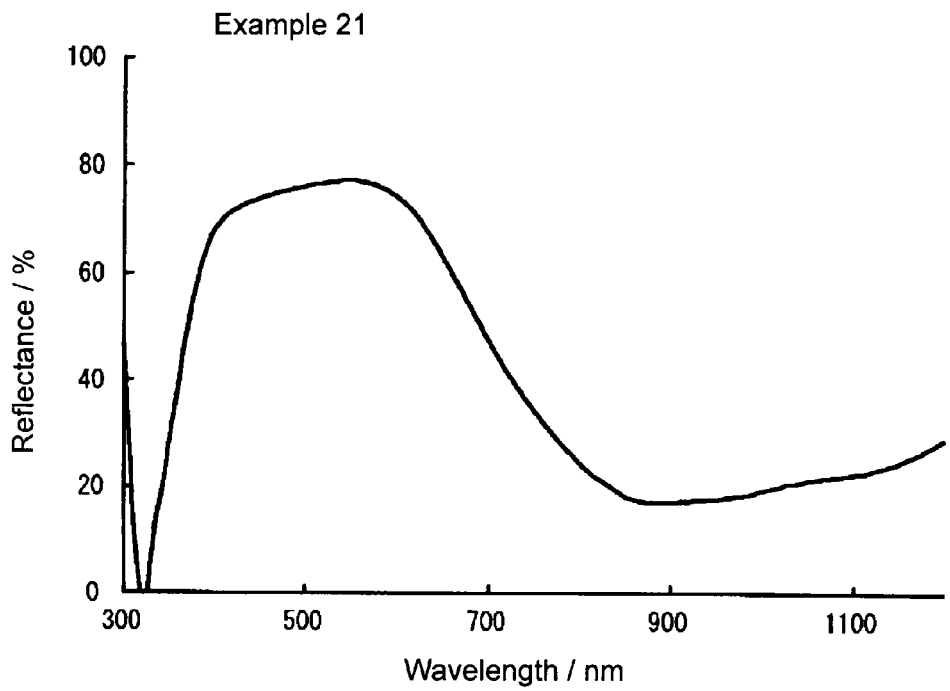
FIG. 11 is the transmission spectrum of the near-infrared-absorbing coating film in Example 21.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 3. Further, the transmission spectrum is shown in FIG. 11.

Example 22

Example for Change in Step (c):

A pulverized product was obtained in the same manner as in Example 2 except that using the fired product in Example 18 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the pulverized product was assumed to be $KCu_4(PO_4)_3$. Further, the size of the crystallites is shown in Table 4.

Further, a dispersion for measuring the particle size of the obtained near-infrared-absorbing particles was prepared, and the number average aggregated particle size was measured. The results are shown in Table 4.

Further, the diffuse reflection spectrum (reflectance) of the near-infrared-absorbing particles was measured. The results are shown in Table 4.

Figure 12:
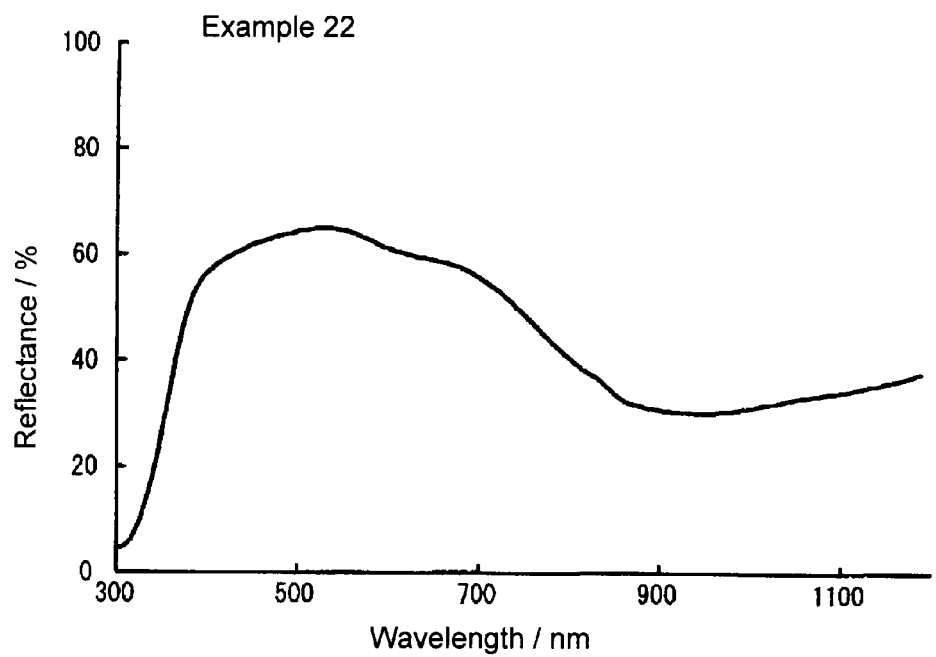
FIG. 12 is the transmission spectrum of the near-infrared-absorbing coating film in Example 22.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 4. Further, the transmission spectrum is shown in FIG. 12.

Example 23

Example for Change in Step (c):

A pulverized product was obtained in the same manner as in Example 2 except that using the fired product in Example 19 instead of the fired product in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the pulverized product was confirmed to have a diffraction pattern different from $KCuPO_4$. Since the pulverized product had a large cation size, the cations are not occluded in the network skeleton made of $Cu^{2+}$ and $PO_4^{3-}$, and as a result, $KCuPO_4$ was not the main crystal structure. Further, the size of the crystallites is shown in Table 4.

Further, a dispersion for measuring the particle size of the obtained near-infrared-absorbing particles was prepared, and the number average aggregated particle size was measured. The results are shown in Table 4.

Further, the diffuse reflection spectrum (reflectance) of the near-infrared-absorbing particles was measured. The results are shown in Table 4.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 4.

Example 24

Example for Change in Step (a):

To 500 g of a 52 mass % dipotassium hydrogen phosphate (manufactured by Junsei Chemical Co., Ltd.) aqueous solution, 500 g of a 5 mass % copper sulfate pentahydrate (manufactured by Junsei Chemical Co., Ltd.) aqueous solution was added with stirring, followed by stirring at room temperature for at least 5 hours. $PO_4^{3}/Cu^{2+}$ (molar ratio) was adjusted to be 15.

From the obtained light-blue solution, the product was separated by suction filtration and washed with water and acetone to obtain a light-blue product. The product was transferred to a crucible and vacuum-dried at 100° C. for two hours. With respect to the dried product, dry pulverization for 30 seconds was carried out twice by means of a wonder blender (manufactured by Osaka Chemical Co., Ltd.).

Example 25

Example for Change in Step (c):

A pulverized product was obtained in the same manner as in Example 2 except that using the product (non-fired product) in step (a) in Example 24 instead of the fired product in Example 1, the number of times of wet pulverization treatment was changed to 20 times.

Analysis/Measurement to Ascertain Pulverized Product:

With respect to the pulverized product, X-ray diffraction was measured. The size of the crystallites is shown in Table 4.

Further, a dispersion for measuring the particle size of the obtained near-infrared-absorbing particles was prepared, and the number average aggregated particle size was measured. The results are shown in Table 4.

Further, the diffuse reflection spectrum (reflectance) of the near-infrared-absorbing particles was measured. The results are shown in Table 4.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 4.

TABLE 1

|  | Ex. 2 | Ex. 3 | Ex. 4 | Ex. 5 | Ex. 6 |
|---|---|---|---|---|---|
| Step (a): |  |  |  |  |  |
| $PO_4^{3-}/Cu^{2+}$ (molar ratio) | 15 | 15 | 15 | 15 | 15 |
| Step (b): |  |  |  |  |  |
| Firing temperature (° C.) | 600 | 600 | 600 | 600 | 600 |
| Step (c): |  |  |  |  |  |
| Powder used | Ex. 1 | Ex. 1 | Ex. 1 | Ex. 1 | Ex. 1 |
| Number of times of wet pulverization treatment | 50 | 30 | 20 | 10 | 8 |
| Near-infrared-absorbing particles: |  |  |  |  |  |
| Crystal structure | $KCuPO_4$ | $KCuPO_4$ | $KCuPO_4$ | $KCuPO_4$ | $KCuPO_4$ |
| Crystal size (nm) | 5 | 10 | 30 | 80 | 100 |
| Number average aggregated particle size (nm) | 21 | 62 | 89 | 132 | 189 |
| Change D in reflectance | −0.46 | −0.46 | −0.46 | −0.46 | −0.46 |
| Reflectance at 500 nm (%) | 86.5 | 86.5 | 86.5 | 86.5 | 86.5 |
| Reflectance at 715 nm (%) | 17.9 | 17.9 | 17.9 | 17.9 | 17.9 |

TABLE 1-continued

|  | Ex. 2 | Ex. 3 | Ex. 4 | Ex. 5 | Ex. 6 |
|---|---|---|---|---|---|
| Near-infrared-absorbing coating film: | | | | | |
| Change D' in transmittance | −0.55 | −0.52 | −0.49 | −0.38 | −0.37 |
| Transmittance at 500 nm (%) | 90.0 | 90.0 | 88.8 | 80.4 | 80.1 |
| Transmittance at 715 nm (%) | 2.2 | 2.8 | 3.0 | 9.9 | 10.0 |
| Transmittance at 900 nm (%) | 1.0 | 1.2 | 1.5 | 1.8 | 2.0 |
| Transmittance at 1,100 nm (%) | 2.0 | 2.0 | 2.8 | 4.2 | 4.5 |
| Haze (%) | 0.2 | 0.2 | 0.2 | 0.2 | 0.5 |
| Film thickness (nm) | 20 | 20 | 20 | 20 | 20 |

TABLE 2

|  | Ex. 11 | Ex. 12 | Ex. 13 | Ex. 14 |
|---|---|---|---|---|
| Step (a): | | | | |
| $PO_4^{3-}/Cu^{2+}$ (molar ratio) | 15 | 15 | 15 | 15 |
| Step (b): | | | | |
| Firing temperature (° C.) | 600 | 600 | 600 | 600 |
| Step (c): | | | | |
| Powder used | Ex. 7 | Ex. 8 | Ex. 9 | Ex. 10 |
| Number of times of wet pulverization treatment | 20 | 20 | 20 | 20 |
| Near-infrared-absorbing particles: | | | | |
| Crystal structure | $LiCuPO_4$ | $RbCuPO_4$ | $Mg_{0.5}CuPO_4$ | $NH_4CuPO_4$ |
| Crystal size (nm) | 30 | 30 | 30 | 30 |
| Number average aggregated particle size (nm) | 76 | 95 | 93 | 57 |
| Change D in reflectance | −0.50 | −0.47 | −0.41 | −0.45 |
| Reflectance at 500 nm (%) | 88.0 | 87.0 | 85.2 | 86.6 |
| Reflectance at 715 nm (%) | 16.8 | 18.0 | 18.3 | 17.4 |
| Near-infrared-absorbing coating film: | | | | |
| Change D' in transmittance | −0.54 | −0.51 | −0.42 | −0.48 |
| Transmittance at 500 nm (%) | 85.6 | 83.0 | 80.6 | 83.2 |
| Transmittance at 715 nm (%) | 3.0 | 3.8 | 4.3 | 4.5 |
| Transmittance at 900 nm (%) | 1.0 | 1.5 | 1.5 | 1.5 |
| Transmittance at 1,100 nm (%) | 2.2 | 2.8 | 3.3 | 3.7 |
| Haze (%) | 0.2 | 0.2 | 0.2 | 0.2 |
| Film thickness (nm) | 20 | 20 | 20 | 20 |

TABLE 3

|  | Ex. 15 | Ex. 20 | Ex. 21 |
|---|---|---|---|
| Step (a): | | | |
| $PO_4^{3-}/Cu^{2+}$ (molar ratio) | 15 | 15 | 7 |
| Step (b): | | | |
| Firing temperature (° C.) | 600 | 600 | 600 |
| Step (c): | | | |
| Powder used | Ex. 1 | Ex. 16 | Ex. 17 |
| Number of times of wet pulverization treatment | 5 | 20 | 20 |
| Near-infrared-absorbing particles: | | | |
| Crystal structure | $KCuPO_4$ | Large amounts of water and hydroxy group deposited on $KCuPO_4$ | Main component was $KCu_4(PO_4)_3$ |
| Crystal size (nm) | 200 | 30 | 30 |
| Number average aggregated particle size (nm) | 342 | 150 | 153 |
| Change D in reflectance | −0.46 | −0.13 | −0.39 |
| Reflectance at 500 nm (%) | 86.5 | 45.0 | 89.1 |
| Reflectance at 715 nm (%) | 17.9 | 16.7 | 29.7 |
| Near-infrared-absorbing coating film: | | | |
| Change D' in transmittance | −0.28 | −0.31 | −0.30 |
| Transmittance at 500 nm (%) | 77.0 | 60.3 | 76.3 |
| Transmittance at 715 nm (%) | 10.0 | 21.8 | 43.1 |
| Transmittance at 900 nm (%) | 2.0 | 18.5 | 17.2 |
| Transmittance at 1,100 nm (%) | 5.0 | 30.7 | 22.4 |
| Haze (%) | 1 | 0.2 | 0.2 |
| Film thickness (nm) | 20 | 20 | 20 |

TABLE 4

|  | Ex. 22 | Ex. 23 | Ex. 25 |
|---|---|---|---|
| Step (a): |  |  |  |
| $PO_4^{3-}/Cu^{2+}$ (molar ratio) | 0.5 | 15 | 15 |
| Step (b): |  |  |  |
| Firing temperature (° C.) | 600 | 600 | Not fired |
| Step (c): |  |  |  |
| Powder used | Ex. 18 | Ex. 19 | Ex. 24 |
| Number of times of wet pulverization treatment | 20 | 20 | 20 |
| Near-infrared-absorbing particles: |  |  |  |
| Crystal structure | Assumed to be $KCu_4(PO_4)_3$ | $(C_2H_5)_4NCuPO_4$ | — |
| Crystal size (nm) | 30 | 30 | 30 |
| Number average aggregated particle size (nm) | 176 | 220 | 216 |
| Change D in reflectance | −0.39 | −0.33 | −0.32 |
| Reflectance at 500 nm (%) | 88.4 | 79.6 | 81.4 |
| Reflectance at 715 nm (%) | 32.7 | 30.1 | 29.3 |
| Near-infrared-absorbing coating film: |  |  |  |
| Change D' in transmittance | −0.06 | −0.24 | −0.28 |
| Transmittance at 500 nm (%) | 64.4 | 55.8 | 76.0 |
| Transmittance at 715 nm (%) | 54.1 | 28.6 | 29.1 |
| Transmittance at 900 nm (%) | 31.0 | 20.8 | 11.1 |
| Transmittance at 1,100 nm (%) | 34.3 | 16.5 | 17.9 |
| Haze (%) | 0.2 | 0.2 | 0.2 |
| Film thickness (nm) | 20 | 20 | 20 |

The near-infrared-absorbing coating films in Examples 2 to 6 and 11 to 14 contained the near-infrared-absorbing particles of the present invention, whereby the transmittance at a wavelength of 500 nm was high at a level of at least 80.0% in each case, the transmittance at a wavelength of 715 nm was low at a level of at most 10.0% in each case, and the change D' in transmittance was sharp and low at a level of at most −0.36 in each case. Further, as in Examples 2 and 3, if the number of times of wet pulverization treatment was increased too much, in the diffuse reflection spectrum of the near-infrared-absorbing particles, the reflectance in the vicinity of a wavelength of from 430 nm to 480 nm decreased. As observed in FIGS. 2 and 3, with the near-infrared-absorbing coating films containing such near-infrared-absorbing particles, the transmittance on the short wavelength side of the visible light region is likely to be low.

In the near-infrared-absorbing coating film in Example 15, the particle size of the near-infrared-absorbing particles was large, whereby the haze was high, the transmittance at a wavelength of 500 nm was low, and the change D' in transmittance was not sharp.

In the near-infrared-absorbing coating films in Examples 20 to 23 and 25, the crystal structures of the near-infrared-absorbing particles were different from the present invention, whereby the transmittance at a wavelength of 500 nm was low, and the transmittance at a wavelength of 715 nm was high, and the change D' in transmittance was not sharp.

Example 26

Example for Change of Conditions in Step (b):
A yellowish green fired product was obtained in the same manner as in Example 1 except that the firing conditions in the step (b) in Example 1 were changed to be 700° C. for 5 minutes in the atmosphere.

Example 27

Example for Change of Conditions in Step (b):
A yellowish green fired product was obtained in the same manner as in Example 1 except that the firing conditions in the step (b) in Example 1 were changed to be 585° C. for 5 minutes in the atmosphere.

Example 28

Example for Change of Condition in Step (a):
A yellowish green fired product was obtained in the same manner as in Example 1 except that the mixing ratio of the raw materials in the step (a) in Example 1 was changed so that $PO_4^{3-}/Cu^{2+}$ (molar ratio) became 13.

Example 29

Example for Change of Condition in Step (a):
A yellowish green fired product was obtained in the same manner as in Example 1 except that the mixing ratio of the raw materials in the step (a) in Example 1 was changed so that $PO_4^{3-}/Cu^{2+}$ (molar ratio) became 18.

Example 30

Example for Change in Step (c):
A pulverized product was obtained in the same manner as in Example 2 except that using the fired product in Example 26 instead of the fired product used in the step (c) in Example 1, the number of times of wet pulverization treatment was changed to 20 times.

Analysis/Measurement to Ascertain Pulverized Product:
With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites is shown in Table 5.

Further, a dispersion for measuring the particle size of the obtained near-infrared-absorbing particles was prepared, and the number average aggregated particle size was measured. The results are shown in Table 5.

Further, the diffuse reflection spectrum (reflectance) of the near-infrared-absorbing particles was measured. The results are shown in Table 5.

Example for Preparation of Dispersion and Coating Film:
A dispersion and a near-infrared-absorbing coating film were obtained in the same manner as in Example 2 except that the near-infrared-absorbing particles were changed.

With respect to such a near-infrared-absorbing coating film, the transmittance and the haze were measured. The results are shown in Table 5.

Example 31

Example for Change in Step (c):
A pulverized product was obtained in the same manner as in Example 2 except that using the fired product in Example 27 instead of the fired product used in the step (c) in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites is shown in Table 5.

Further, a dispersion for measuring the particle size of the obtained near-infrared-absorbing particles was prepared, and the number average aggregated particle size was measured. The results are shown in Table 5.

Further, the diffuse reflection spectrum (reflectance) of the near-infrared-absorbing particles was measured. The results are shown in Table 5.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 5.

Example 32

Example for Change in Step (c):

A pulverized product was obtained in the same manner as in Example 2 except that using the fired product in Example 28 instead of the fired product used in the step (c) in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites is shown in Table 5.

Further, a dispersion for measuring the particle size of the obtained near-infrared-absorbing particles was prepared, and the number average aggregated particle size was measured. The results are shown in Table 5.

Further, the diffuse reflection spectrum (reflectance) of the near-infrared-absorbing particles was measured. The results are shown in Table 5.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 5.

Example 33

Example for Change in Step (c):

A pulverized product was obtained in the same manner as in Example 2 except that using the fired product in Example 29 instead of the fired product used in the step (c) in Example 1, the number of times of wet pulverization treatment was changed to 20 times.

Analysis/Measurement to Ascertain Pulverized Product:

With respect to the pulverized product, X-ray diffraction was measured. From the results of the X-ray diffraction, the crystal structure of $KCuPO_4$ was confirmed, and the pulverized product was identified to be near-infrared-absorbing particles consisting essentially of crystallites of $KCuPO_4$. Further, the size of the crystallites is shown in Table 5.

Further, a dispersion for measuring the particle size of the obtained near-infrared-absorbing particles was prepared, and the number average aggregated particle size was measured. The results are shown in Table 5.

Further, the diffuse reflection spectrum (reflectance) of the near-infrared-absorbing particles was measured. The results are shown in Table 5.

Example for Preparation of Dispersion and Coating Film:

A dispersion and a near-infrared-absorbing coating film were obtained in the same manner as in Example 2 except that the near-infrared-absorbing particles were changed. With respect to such a near-infrared-absorbing coating film, the transmittance and the haze were measured. The results are shown in Table 5.

TABLE 5

|  | Ex. 30 | Ex. 31 | Ex. 32 | Ex. 33 |
|---|---|---|---|---|
| Step (a): | | | | |
| $PO_4^{3-}/Cu^{2+}$ (molar ratio) | 15 | 15 | 13 | 18 |
| Step (b): | | | | |
| Firing temperature (° C.) | 700 | 585 | 600 | 600 |
| Step (c): | | | | |
| Powder used | Ex. 26 | Ex. 27 | Ex. 28 | Ex. 29 |
| Number of times of wet pulverization treatment | 20 | 20 | 20 | 20 |
| Near-infrared-absorbing particles: | | | | |
| Crystal structure | $KCuPO_4$ | $KCuPO_4$ | $KCuPO_4$ | $KCuPO_4$ |
| Crystal size (nm) | 28 | 30 | 30 | 30 |
| Number average aggregated particle size (nm) | 85 | 87 | 103 | 110 |
| Change D in reflectance | −0.46 | −0.46 | −0.46 | −0.46 |
| Reflectance at 500 nm (%) | 86.5 | 86.5 | 86.5 | 86.5 |
| Reflectance at 715 nm (%) | 17.9 | 17.9 | 17.9 | 17.9 |
| Near-infrared-absorbing coating film: | | | | |
| Change D' in transmittance | −0.50 | −0.50 | −0.48 | −0.49 |
| Transmittance at 500 nm (%) | 89.0 | 88.9 | 87.2 | 87.0 |
| Transmittance at 715 nm (%) | 2.7 | 2.9 | 3.0 | 3.1 |
| Transmittance at 900 nm (%) | 1.5 | 1.5 | 1.7 | 1.6 |
| Transmittance at 1,100 nm (%) | 2.6 | 2.9 | 3.4 | 3.3 |
| Haze (%) | 0.2 | 0.2 | 0.2 | 0.2 |
| Film thickness (nm) | 20 | 20 | 20 | 20 |

INDUSTRIAL APPLICABILITY

The near-infrared-absorbing particles of the present invention are useful as a near-infrared-absorbing material to be incorporated to a near infrared filter for a camera, an optical filter for a plasma display, a near-infrared-absorbing coating film for e.g. a glass window for a vehicle (such as an automobile), a lamp, etc.

This application is a continuation of PCT Application No. PCT/JP2010/067166, filed Sep. 30, 2010, which is based upon and claims the benefit of priority from Japanese Patent Application No. 2009-227554 filed on Sep. 30, 2009. The contents of those applications are incorporated herein by reference in its entirety.

What is claimed is:

1. Near-infrared-absorbing particles consisting essentially of crystallites of a compound represented by the following formula (1) and having a number average aggregated particle size of at most 200 nm:

$$A_{1/n}CuPO_4 \quad (1),$$

wherein A is at least one member selected from the group consisting of an alkali metal, an alkaline earth metal and $NH_4$, and n is 1 when A is an alkali metal or $NH_4$, or 2 when A is an alkaline earth metal, wherein the near-infrared region is from 700 to 1,100 nm, and wherein the size of the crystallites obtained from the X-ray diffraction is from 5 to 80 nm.

2. Near-infrared-absorbing particles consisting essentially of crystallites of a compound represented by the following formula (1) and having a number average aggregated particle size of from 20 to 200 nm:

$$A_{1/n}CuPO_4 \quad (1),$$

wherein A is one member selected from the group consisting of an alkali metal, an alkaline earth metal and $NH_4$, and n is 1 when A is an alkali metal or $NH_4$, or 2 when A is an alkaline earth metal, wherein the near-infrared region is from 700 to 1,100 nm, and wherein the size of the crystallites obtained from the X-ray diffraction is from 5 to 80 nm.

3. The near-infrared-absorbing particles according to claim 2, wherein the change D in reflectance represented by the following formula (2) is at most −0.41:

$$D(\%/nm)=[R_{700}(\%)-R_{600}(\%)]/[700(nm)-600(nm)] \quad (2),$$

wherein $R_{700}$ is the reflectance at a wavelength of 700 nm in the diffuse reflection spectrum of the near-infrared-absorbing particles, and $R_{600}$ is the reflectance at a wavelength of 600 nm in the diffuse reflection spectrum of the near-infrared-absorbing particles.

4. The near-infrared-absorbing particles according to claim 2, wherein the reflectance of the near-infrared-absorbing particles at a wavelength of 715 nm in the diffuse reflection spectrum is at most 19%, and the reflectance of the particles at a wavelength of 500 nm in the diffuse reflection spectrum is at least 85%.

5. The near-infrared-absorbing particles according to claim 2, wherein in the microscopic IR spectrum, based on the absorption intensity at 100% of a peak in the vicinity of 1,000 $cm^{-1}$ attributable to a phosphate group, the absorption intensity of a peak in the vicinity of 1,600 $cm^{-1}$ attributable to water is at most 8%, and the absorption intensity of a peak in the vicinity of 3,750 $cm^{-1}$ attributable to a hydroxy group is at most 26%.

6. The near-infrared-absorbing particles according to claim 1, wherein the change D in reflectance represented by the following formula (2) is at most −0.41:

$$D(\%/nm)=[R_{700}(\%)-R_{600}(\%)]/[700(nm)-600(nm)] \quad (2),$$

wherein $R_{700}$ is the reflectance at a wavelength of 700 nm in the diffuse reflection spectrum of the near-infrared-absorbing particles, and $R_{600}$ is the reflectance at a wavelength of 600 nm in the diffuse reflection spectrum of the near-infrared-absorbing particles.

7. The near-infrared-absorbing particles according to claim 1, wherein the reflectance of the near-infrared-absorbing particles at a wavelength of 715 nm in the diffuse reflection spectrum is at most 19%, and the reflectance of the particles at a wavelength of 500 nm in the diffuse reflection spectrum is at least 85%.

8. The near-infrared-absorbing particles according to claim 1, wherein in the microscopic IR spectrum, based on the absorption intensity at 100% of a peak in the vicinity of 1,000 $cm^{-1}$ attributable to a phosphate group, the absorption intensity of a peak in the vicinity of 1,600 $cm^{-1}$ attributable to water is at most 8%, and the absorption intensity of a peak in the vicinity of 3,750 $cm^{-1}$ attributable to a hydroxy group is at most 26%.

9. A process for producing the near-infrared-absorbing particles of claim 1, the process comprising:
(a) mixing a salt containing $Cu^{2+}$ and a salt or organic substance containing $PO_4^{3-}$ in a molar ratio of $PO_4^{3-}$ to $Cu^{2+}$ ($PO_4^{3-}/Cu^{2+}$) from 10 to 20, in the presence of $A^{n+}$, wherein A is at least one member selected from the group consisting of an alkali metal, an alkaline earth metal, and $NH_4$, and n is 1 when A is an alkali metal or $NH_4$, or 2 when A is an alkaline earth metal,
(b) firing the product obtained in (a) at from 560 to 760° C., and
(c) pulverizing the fired product obtained in (b) so that the number average aggregated particle size becomes at most 200 nm.

10. A process for producing the near-infrared-absorbing particles the process comprising:
(a) mixing a salt containing $Cu^{2+}$ and a salt or organic substance containing $PO_4^{3-}$ in a molar ratio of $PO_4^{3-}$ to $Cu^{2+}$ ($PO_4^{3-}/Cu^{2+}$) from 10 to 20, in the presence of $A^{n+}$, wherein A is at least one member selected from the group consisting of an alkali metal, an alkaline earth metal, and $NH_4$, and n is 1 when A is an alkali metal or $NH_4$, or 2 when A is an alkaline earth metal,
(b) firing the product obtained in (a) at from 560 to 760° C., and
(c) pulverizing the fired product obtained in (b) so that the number average aggregated particle size becomes from 20 to 200 nm.

11. A dispersion comprising the near-infrared-absorbing particles as defined in claim 1, dispersed in a dispersing medium.

12. The dispersion according to claim 11, which contains from 10 to 60 mass % of the near-infrared-absorbing particles as a solid content of the dispersion.

13. A dispersion comprising the near-infrared-absorbing particles as defined in claim 2, dispersed in a dispersing medium.

14. The dispersion according to claim 13, which contains from 10 to 60 mass % of the near-infrared-absorbing particles as a solid content of the dispersion.

15. An article having a near-infrared-absorbing coating film, wherein the near-infrared-absorbing coating film contains the near-infrared-absorbing particles as defined in claim 1, and is formed on a substrate.

16. An article having a near-infrared-absorbing coating film, wherein the near-infrared-absorbing coating film contains the near-infrared-absorbing particles as defined in claim 2, and is formed on a substrate.

17. The article having a near-infrared-absorbing coating film according to claim 15, wherein in the near-infrared-absorbing coating film, the change D' in transmittance represented by the following formula (3) is at most −0.36:

$$D'(\%/nm)=[T_{700}(\%)-T_{630}(\%)]/[700(nm)-630(nm)] \quad (3),$$

wherein $T_{700}$ is the transmittance at a wavelength of 700 nm of the near-infrared-absorbing coating film, and $T_{630}$ is the transmittance at a wavelength of 630 nm of the near-infrared-absorbing coating film.

18. The article having a near-infrared-absorbing coating film according to claim 16, wherein in the near-infrared-absorbing coating film, the change D' in transmittance represented by the following formula (3) is at most −0.36:

$$D'(\%/nm) = [T_{700}(\%) - T_{630}(\%)] / [700(nm) - 630(nm)] \quad (3),$$

wherein $T_{700}$ is the transmittance at a wavelength of 700 nm of the near-infrared-absorbing coating film, and $T_{630}$ is the transmittance at a wavelength of 630 nm of the near-infrared-absorbing coating film.

19. The near-infrared-absorbing particles according to claim 1, wherein the alkaline metal is at least one metal selected from the group consisting of Li, Na, K, Rb and Cs and the alkaline earth metal is at least one method selected from the group consisting of Mg, Ca, Sr and Ba.

20. The near-infrared-absorbing particles according to claim 2, wherein the alkaline metal is at least one metal selected from the group consisting of Li, Na, K, Rb and Cs and the alkaline earth metal is at least one method selected from the group consisting of Mg, Ca, Sr and Ba.

* * * * *

UNITED STATES PATENT AND TRADEMARK OFFICE
CERTIFICATE OF CORRECTION

| | | |
|---|---|---|
| PATENT NO. | : 8,642,174 B2 | Page 1 of 1 |
| APPLICATION NO. | : 13/432254 | |
| DATED | : February 4, 2014 | |
| INVENTOR(S) | : Wakako Ito et al. | |

It is certified that error appears in the above-identified patent and that said Letters Patent is hereby corrected as shown below:

On the title page, Item (63), the Related U.S. Application Data Information is incorrect. Item (63) should read:

--Related U.S. Application Data

(63) Continuation of application No. PCT/JP2010/067166, filed on Sep. 30, 2010--

Signed and Sealed this
Sixth Day of May, 2014

Michelle K. Lee
*Deputy Director of the United States Patent and Trademark Office*